(12) United States Patent
Ogura

(10) Patent No.: US 9,112,292 B2
(45) Date of Patent: Aug. 18, 2015

(54) TERMINAL STRUCTURE

(71) Applicant: MAKITA CORPORATION, Anjo-shi, Aichi (JP)

(72) Inventor: Hironori Ogura, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 0 days.

(21) Appl. No.: 13/778,889

(22) Filed: Feb. 27, 2013

(65) Prior Publication Data

US 2013/0244504 A1 Sep. 19, 2013

(30) Foreign Application Priority Data

Mar. 16, 2012 (JP) ................................. 2012-060080
Mar. 16, 2012 (JP) ................................. 2012-060093

(51) Int. Cl.
*H01R 13/11* (2006.01)
*H01R 13/05* (2006.01)
*H01M 2/10* (2006.01)

(52) U.S. Cl.
CPC .............. *H01R 13/11* (2013.01); *H01R 13/055* (2013.01); *H01R 13/112* (2013.01); *H01R 13/113* (2013.01); *H01M 2/1022* (2013.01)

(58) Field of Classification Search
CPC .................................................. H01R 13/112
USPC .............. 439/856, 857, 927, 374, 929, 57, 68
See application file for complete search history.

(56) References Cited

U.S. PATENT DOCUMENTS 1,477,527 A * 12/1923 Raettig .......................... 200/282
3,862,792 A * 1/1975 Jayne .......................... 439/733.1
(Continued)

FOREIGN PATENT DOCUMENTS

| CN | 201966387 U | 9/2011 |
| JP | 03-104968 U | 10/1991 |

(Continued)

OTHER PUBLICATIONS

Dec. 8, 2014 Search Report issued in European Application No. 13157582.1.

(Continued)

*Primary Examiner* — Phuong Dinh
(74) *Attorney, Agent, or Firm* — Oliff PLC

(57) ABSTRACT

A terminal structure provided with a male terminal and a female terminal that includes with at least one set of elastic plate parts is disclosed. The male terminal is inserted between the elastic plate parts of the female terminal in a predetermined direction to cause each side surface of the male terminal to be pressed from each side of the elastic plate part due to the elastic force of the elastic plate parts, and the male terminal and the female terminal are electrically connected to each other. A position of the surface of the male terminal with which one elastic plate is brought into contact differs, in the insertion direction of the male terminal, from a position of the other surface of the male terminal with which the other elastic plate is brought into contact.

14 Claims, 18 Drawing Sheets

(56) References Cited

U.S. PATENT DOCUMENTS

| | | | |
|---|---|---|---|
| 3,945,710 | A | 3/1976 | Gartland, Jr. |
| 4,140,361 | A * | 2/1979 | Sochor .......................... 439/682 |
| 4,722,704 | A | 2/1988 | VanDerStuyf et al. |
| 4,795,379 | A * | 1/1989 | Sasaki et al. .................. 439/856 |
| 5,145,422 | A * | 9/1992 | Fry ................................ 439/856 |
| 5,151,056 | A | 9/1992 | McClune |
| 5,252,097 | A * | 10/1993 | Lindeberg et al. ............ 439/856 |
| 5,927,999 | A * | 7/1999 | Shimojyo ........................ 439/63 |
| 5,971,784 | A * | 10/1999 | Fabian et al. ................. 439/224 |
| 6,250,974 | B1 * | 6/2001 | Kerek .......................... 439/843 |
| 6,350,149 | B1 * | 2/2002 | Nakane ......................... 439/500 |
| 6,932,660 | B2 * | 8/2005 | Roepke ......................... 439/856 |
| 7,243,734 | B2 * | 7/2007 | Wu ............................... 173/217 |
| 8,282,413 | B2 * | 10/2012 | Fukumoto et al. ............ 439/500 |

FOREIGN PATENT DOCUMENTS

| | | |
|---|---|---|
| JP | 2001-057204 A | 2/2001 |
| JP | A-2001-57204 | 2/2001 |

OTHER PUBLICATIONS

Nov. 25, 2014 Office Action issued in Chinese Application No. 201310084181.6.

May 26, 2015 Office Action issued in Japanese Application No. 2012-060093.

* cited by examiner

TERMINAL STRUCTURE

This application claims priority to Japanese patent application serial number 2012-60080 and Japanese patent application serial number 2012-60093, the contents of which are incorporated herein by reference.

BACKGROUND OF THE INVENTION

1. Field of the Invention

The present invention relates to a terminal structure which is provided with a male terminal and a female terminal having at least one set of elastic plate parts and in which the male terminal is inserted between the at least one set of elastic plate parts of the female terminal from a fixed direction to cause both side surfaces of the male terminal to be pressed from both sides between the elastic plate parts due to the elastic force of the elastic plate parts, and the male terminal and the female terminal are electrically connected to each other.

2. Description of the Related Art

A prior art relating to the terminal structure described above is disclosed in Japanese Laid-Open Patent Publication No. 2001-057204.

As shown in FIG. 24 to FIG. 26, the terminal structure disclosed in Japanese Laid-Open Patent Publication No. 2001-057204 is provided with flat-plate-like male terminals 101 (refer to FIG. 26) and female terminals 105 having a plurality of sets of elastic plate parts 103 and 104 configured to allow the male terminals 101 to be inserted in a predetermined direction (refer to FIG. 24 and FIG. 25).

The left and right elastic plate parts 103 and 104 of female terminal 105 are provided at the same height above left and right support plate parts 107 and 108 that are disposed in parallel, and are bent so as to approach each other as they extend from the support plate parts 107 and 108. That is, as shown in FIG. 25, the elastic plate parts 103 and 104 are formed symmetrically with respect to an insertion center line CL of the male terminal 101, and when the male terminal 101 is inserted, contact parts 103c and 104c formed at the distal end positions (rear end positions) of the elastic plate parts 103 and 104 are held in contact with each side surfaces of the male terminal 101.

Due to the above construction, when the male terminal 101 is inserted into the female terminal 105, the right and left elastic plate parts 103 and 104 of the female terminal 105 are forced to spread each other with respect to the insertion center line CL by the male terminal 101 against the elastic force. Then, the left side surface and the right side surface of the male terminal 101 are pressed by the contact parts 103c and 104c of the left and right elastic plate parts 103 and 104 of the female terminal 105, and the male terminal 101 and the female terminal 105 are electrically connected to each other.

Further, two sets of the above-mentioned female terminals 105 may be provided in line in the insertion direction of the male terminal 101. By providing two sets of the female terminals 105 in this way, contact areas between the male terminal 101 and the female terminals 105 increase, and it becomes possible to reduce the electric current that flows through one contact part. As a result, wear of the terminals can be suppressed and operating life of the terminal can be increased.

As shown in FIGS. 24 and 2 FIG. 5, the elastic plate parts 103 and 104 of each female terminal 105 of the above-described terminal structure are formed symmetrically with respect to the insertion center line CL of the male terminal 101, and are provided at the same height. Thus, the positions where the contact parts 103c of the left-hand side elastic plate parts 103 of the female terminal 105 are held in contact with the left side surface of the male terminal 101, and the positions where the contact parts 104c of the right-hand side elastic plate parts 104 are held in contact with the right-hand side surface of the male terminal 101, are the same in height and the insertion direction.

That is, as the male terminal 101 is inserted and extracted to and from the female terminals 105 many times, the right and left side surfaces of the male terminal 101 are worn away at the same position over time. Further, when the male terminal 101 is worn away by half in thickness over time, a hole may be created in the male terminal 101 as a result of the wear, and the terminal will not be unusable. Thus, at the time when the male terminal is worn away by half in thickness, the terminal reaches an end of the operating life.

Further, in the construction in which two sets of the female terminals 105 are provided in line in the insertion direction of the male terminal 101, it is necessary for the male terminal 101 to extend in the insertion direction. As a result, a size of the male terminal 101 increases. Further, since two sets of the female terminals 105 are disposed in line in the insertion direction of the male terminal 101, a installation space for the female terminals 105 will be large.

SUMMARY OF THE INVENTION

Thus, there is a need in the art to increase the operating life of a terminal structure. Further, there is a need to reduce an electric current that flows through contact parts by increasing the contact areas of the male and female terminals, and to limit the size of the male terminal and the installation space for the female terminal.

One construction includes a terminal structure provided with a male terminal and a female terminal that includes at least one set of elastic plate parts and in which the male terminal is inserted between the at least one set of elastic plate parts of the female terminal in a predetermined insertion direction to cause each side surface of the male terminal to be pressed by the elastic plate parts due to the elastic force of the elastic plate parts. With this, the male terminal and the female terminal are electrically connected to each other. Further, a position of one surface of the male terminal with which one elastic plate part is held in contact at a contact part of the one elastic plate part differs from a position of the other surface of the male terminal with which the other elastic plate part is held in contact at a contact part of the other elastic plate part, in the insertion direction of the male terminal or in a direction orthogonal to the insertion direction.

According to this construction, a position of one side surface of the male terminal worn away over time through a contact with one elastic plate part of the female terminal, and a position of the opposite side surface of the male terminal worn away over time through a contact with the other elastic plate part, differs each other in the insertion direction of the male terminal or in a direction orthogonal to the insertion direction. That is, the worn position of one side surface and the worn position of the opposite side surface of the male terminal caused by at least one set of elastic plate parts, are deviated. As result, for example, even in the case where the male terminal is worn away by half or more in thickness by one elastic plate part, it is possible to use the terminal structure. That is, an operating life of the terminal structure can be improved.

According to another construction, in a state in which the male terminal is not inserted into the female terminal, a contact part of one elastic plate part of the female terminal extends toward the other elastic plate part over a center line along which the male terminal is inserted, and a contact part of the other elastic plate part of the female terminal extends toward the one elastic plate part over the center line.

As a result, as compared with the known art in which the contact part of one elastic plate part and the contact part of the other elastic plate part are held in contact with each other, it is possible to increase a pressing force of the elastic plate parts with respect to the male terminal under the same conditions in thickness and length etc. as those of the known art. As a result, it is possible to prevent contact failure between the male terminal and the female terminal.

According to another construction, elastic plate parts of the female terminal are supported by a support plate part, on the front side and the rear side of which contact parts are respectively provided. Further, the other elastic plate parts of the female terminal are similarly supported by a support plate part, on the front side and the rear sides of which contact parts are respectively provided.

Thus, as compared with a case where an elastic plate part provided with one contact part is supported by one support plate part, and two sets of such elastic plate parts and support plate parts are arranged in line in the insertion direction of the male terminal (i.e., in the longitudinal direction), it is possible to decrease a longitudinal distance of the female terminal.

According to another construction, the support plate part is formed such that a movement of the front side contact part of the elastic plate part is not transmitted to the rear side contact part, or such that a movement of the rear side contact part is not transmitted to the front side contact part.

That is, the support plate part is configured such that a force may not be transmitted in the longitudinal direction, and thus the support plate parts function in the same way as two independent front and rear support plate parts do.

According to another construction, there is provided a terminal structure provided with a male terminal and a female terminal that includes at least one set of elastic plate parts and in which the male terminal is inserted between the at least one set of elastic plate parts of the female terminal in a predetermined insertion direction to cause each side surface of the male terminal to be pressed by the elastic plate parts due to the elastic force of the elastic plate parts. With this, the male terminal and the female terminal are electrically connected to each other, and the female terminal is provided with another elastic plate part that can be elastically deformed in a direction different from a direction in which the at least one set of elastic plate parts is deformed, and the other elastic plate part is capable of pressing another surface of the male terminal other than the side surfaces of the male terminal.

According to this construction, when the male terminal is inserted between at least one set of elastic plate parts of the female terminal (hereinafter referred to as the set elastic plate parts), that is, when both side surfaces of the male terminal are pressed by the set elastic plate parts, a surface other than both side surfaces is pressed by the other elastic plate part. In this way, by providing another elastic plate part, it is possible to increase the contact areas between the male terminal and the female terminal, which reduces an electric current that flows through one contact part and improve an operating life of the terminals.

Further, due to the construction in which both side surfaces of the male terminal are pressed by the set elastic plate parts and in which a surface other than both side surfaces of the male terminal is pressed by another elastic plate part, it is possible to arrange the set elastic plate parts and the other elastic plate part at substantially the same position in the insertion direction of the male terminal. That is, there is no need to arrange the set elastic plate parts of the female terminal and the other elastic plate part in line in the insertion direction of the male terminal. As a result, the female terminal is not elongated in the insertion direction of the male terminal, making it possible to limit an installation space for the female terminal. Further, since the female terminal is not elongated in the insertion direction of the male terminal, there is no need to elongate the male terminal in the insertion direction thereof.

According to another construction, the other elastic plate part is configured to press a lower surface of the male terminal.

Thus, the other elastic plate part may not block the insertion of the male terminal. As a result, it is possible to provide a plurality of other elastic plate parts in the insertion direction of the male terminal.

According to another construction, a plurality of the female terminals are provided in the insertion direction of the male terminal.

As a result, it is possible to further increase contact areas of the male terminal and the female terminal, making it possible to further reduce an electric current that flows through one contact part. Further, it is possible to improve connection reliability of the male terminal and the female terminal.

According to another construction, the male terminal and the female terminal are provided for a power terminal or a signal terminal.

According to another construction, the male terminal is provided in an electric tool, whereas the female terminal is provided in a battery pack.

According to another construction, the male terminal is provided in a battery pack, whereas the female terminal is provided in an electric tool.

According to another construction, the male terminal is provided in a charger, whereas the female terminal is provided in a battery pack.

According to another construction, the male terminal is provided in a battery pack, whereas the female terminal is provided in a charger.

According to the above, the operating life of a terminal structure can be increased. By increasing the contact areas of the male terminal and the female terminal, the electric current that flows through one contact part is reduced, and the operating life of the terminals can be improved. Further, though the contact areas of the male terminal and the female terminal increase, the size of the male terminal and the installation space for the female terminal can be limited.

DESCRIPTION OF THE PREFERRED EMBODIMENTS

Figure 1:
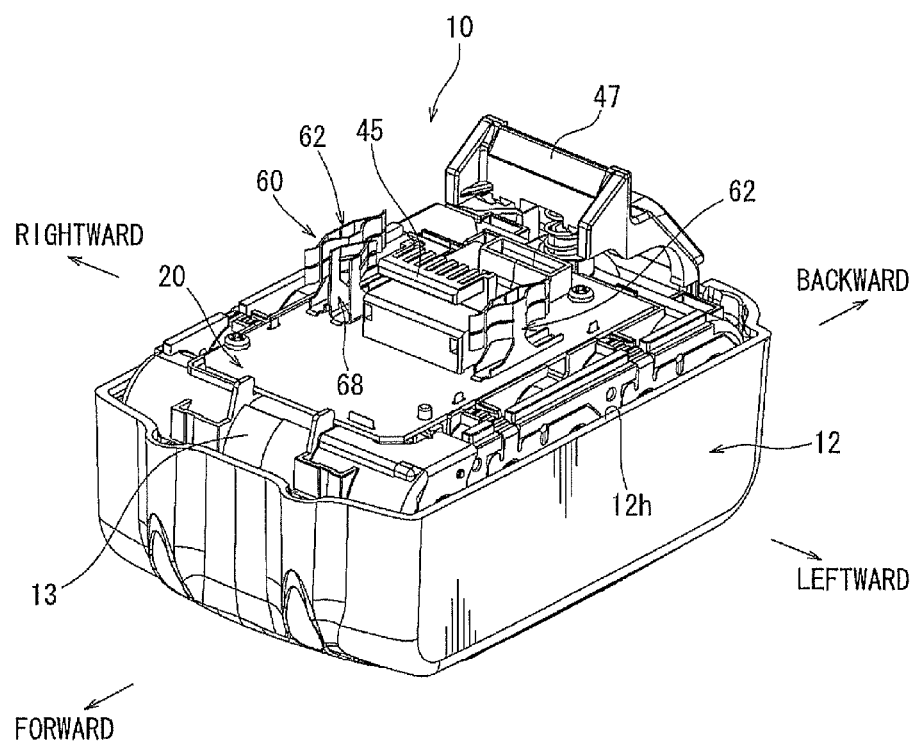
FIG. 1 is an overall perspective view of a battery pack provided with a female terminal of a terminal structure according to an example of the present invention, with the cover part of the battery pack removed therefrom.

Each of the additional features and teachings disclosed above and below may be utilized separately or in conjunction with other features and teachings to provide an improved terminal structure. Representative examples of the present teaching, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

In the following, a terminal structure according to an example of the present invention will be described with reference to FIG. 1 to FIG. 7.

A terminal structure 50 according to the example includes male power terminals 55 and a male signal terminal 57 that are provided in an electric tool, and female power terminals 62 and a female signal terminal 68 that are provided in a battery pack 10.

The front, rear, right, left, upper, and lower sides in the drawings correspond to those of the battery pack 10.

First, before the terminal structure 50 is described, a brief explanation of the battery pack 10 will be made with reference to FIG. 1 and FIG. 2.

Figure 2:
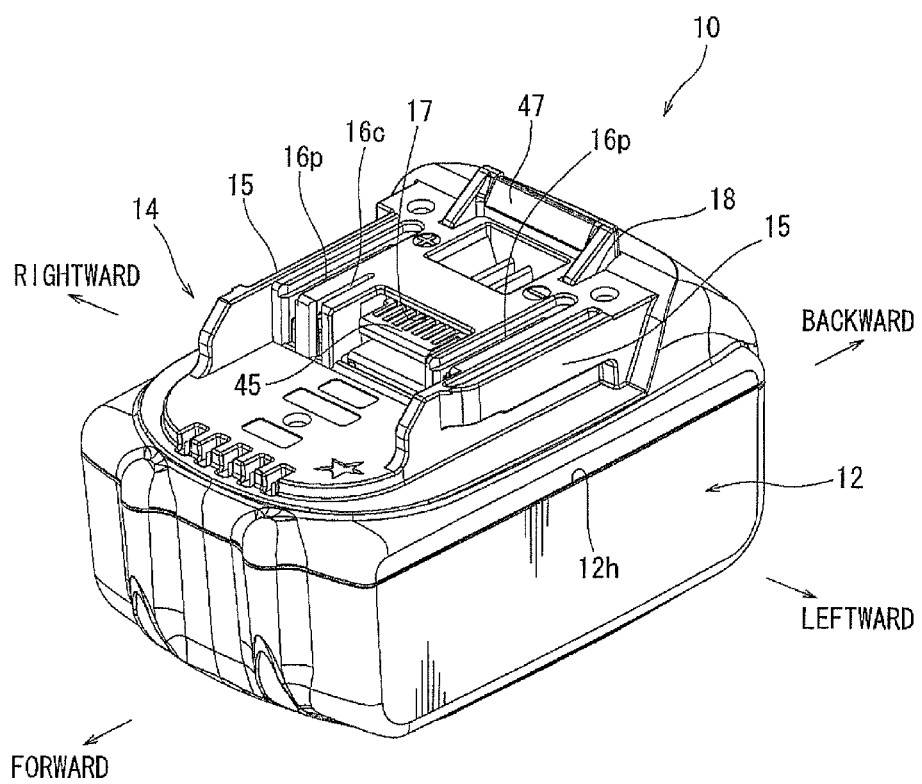
FIG. 2 is an overall perspective view of the battery pack.

The battery pack 10 includes an open-top type housing main body part 12 that houses a plurality of cells (not shown), and also includes a cover part 14 that covers an upper opening 12h of the housing main body part 12 (refer to FIG. 2).

As shown in FIG. 1, the plurality of cells are housed in the housing main body part 12 by use of a cell holder 13. And, a board 20 of an electric circuit of the battery pack 10 is placed on the cell holder 13 via an insulation plate part (not shown). On the top surface of the board 20, there are provided various electrical components (not shown) including the electric circuit, a connector 45, female terminals 60 (female power terminals 62 and a female signal terminal 68) of the terminal structure 50, etc.

As shown in FIG. 2, the cover part 14 that covers the upper opening 12h of the housing main body part 12 includes, at both the right and left sides thereof, slide rails 15 configured to be used for connecting the electric tool (not shown) and formed so as to extend in the longitudinal direction. Further, at the central part of the upper surface of the cover part 14, there are provided, between the right and left slide rails 15, a pair of right and left power source guide slits 16p respectively allowing male power terminals 55 (refer to FIG. 4) of the electric tool to be inserted from the front side, and a signal guide slit 16c situated on the left-hand side of the right-hand side power source guide slit 16p. The guide slits 16p and 16c extended in the longitudinal direction. And, as shown in FIG. 1, in the inner side of the cover part 14 and at positions corresponding to the right and left power source guide slits 16p, there are arranged female power terminals 62 into which the male power terminals 55 of the electric tool can be inserted for connection. Further, in the inner side of the cover part 14 and at a position corresponding to the signal guide slit 16c, there is arranged a female signal terminal 68 that can be connected to a male signal terminal 57 of the electric tool.

Further, as shown in FIG. 2, a connector opening 17 is provided between the right and left power source guide slits 16p, and a connector 45 protrudes from the connector opening 17.

Further, at the rear part of the upper surface of the cover part 14, there is provided, at the rear of the right and left power source guide slits 16p, an opening 18 from which a hook 47 (refer to FIG. 1) protrudes in order to lock the electric tool.

Figure 3:
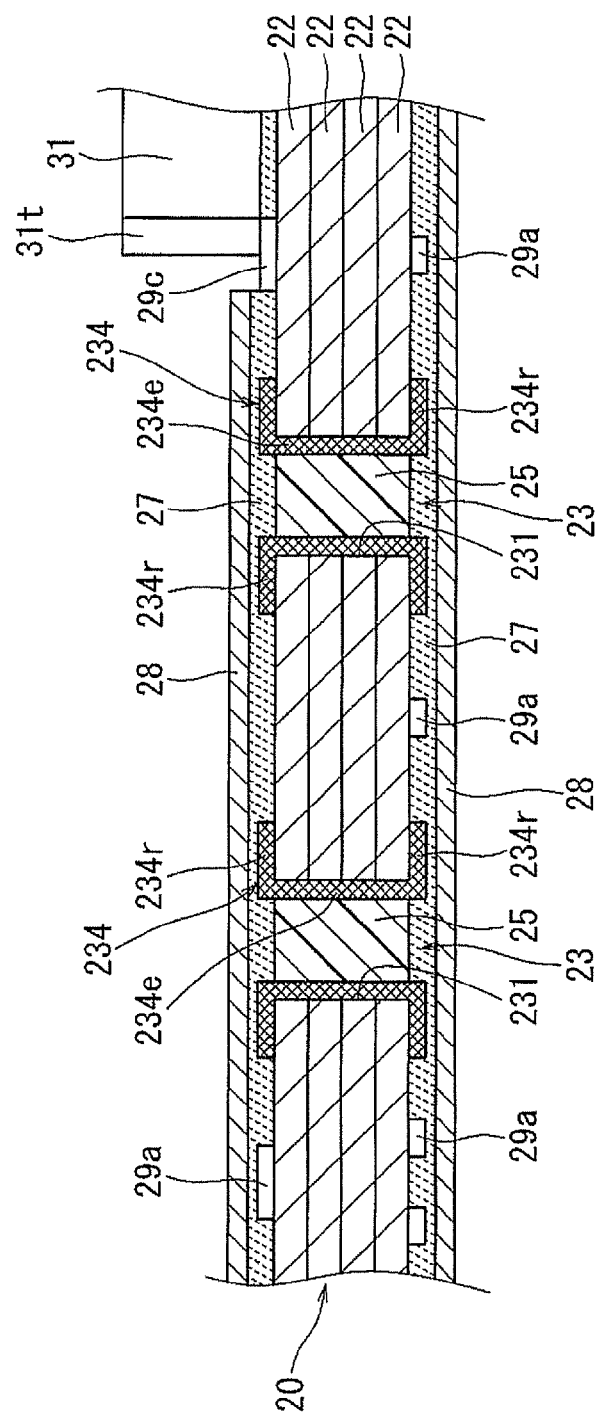
FIG. 3 is a schematic longitudinal sectional view of a board of an electric circuit used in the battery pack.
Figure 4:
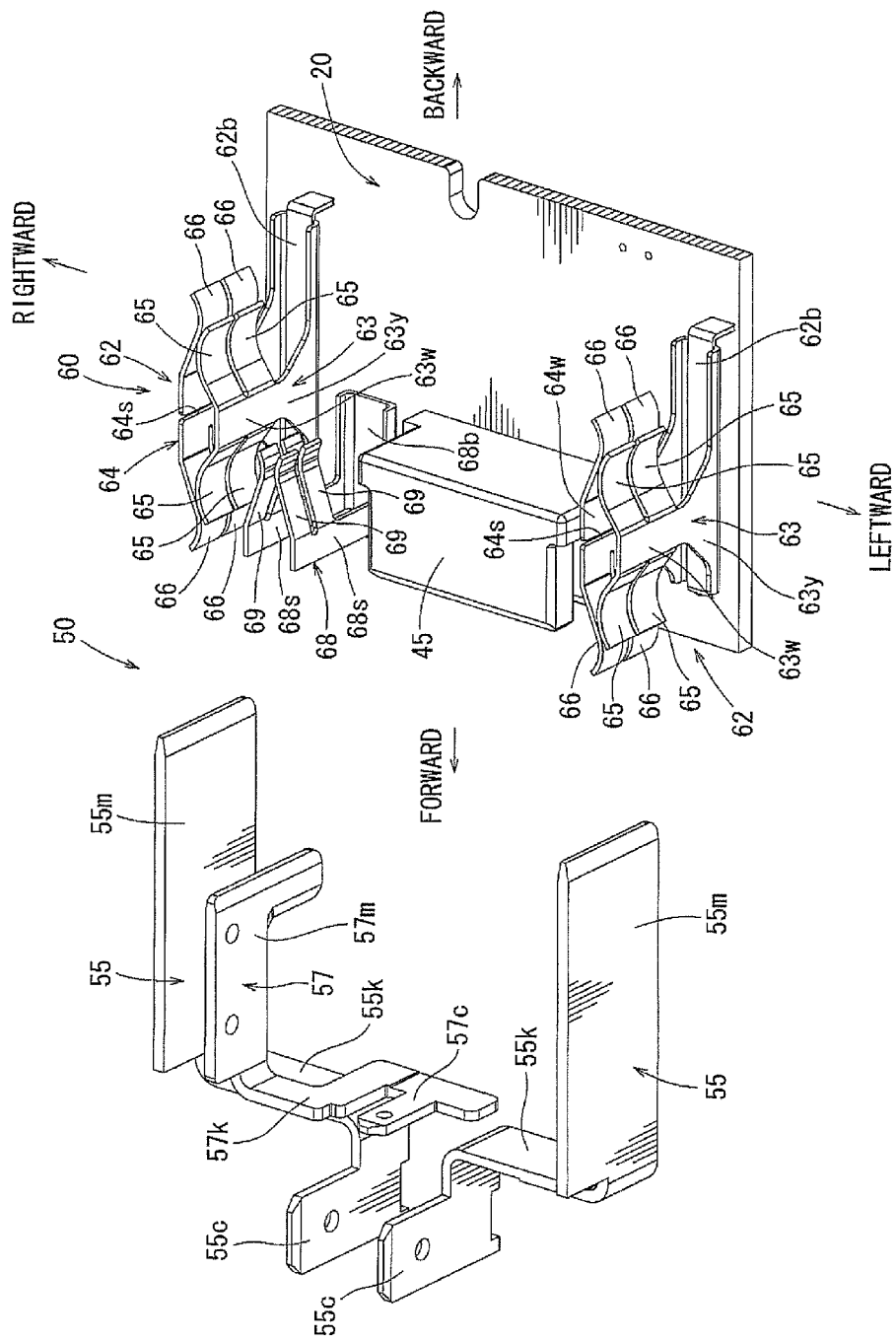
FIG. 4A and FIG. 4B are perspective views of the terminal structure according to the example.

As shown in FIG. 3, a multi-layer board is used as the board 20 of the electric circuit. FIG. 3 is a sectional view schematically showing a structure of the board 20 so as to easily understand the structure, and it should be noted that the board as depicted differs from an actual scale of the board 20.

A multi-layer board is formed by laminating a plurality of single-layer boards 22 each provided with circuit patterns (not shown), and predetermined areas of the circuit patterns between the single-layer boards 22 can be conducted via through-holes 23. The through-holes 23 includes through holes 231 extending from the front surface (upper surface) to the back surface (lower surface) of the multi-layer board 20 (hereinafter termed board 20) that are exposed inside the battery housing 12 and 14, and also includes copper plating area 234 that covers the inner peripheral surfaces of the through-holes 231 and the peripheral edges of the openings thereof. The copper plating area 234 includes cylindrical area 234e that covers the inner peripheral holes of the through-holes 231, and also includes land area 234r that covers the peripheral edges of the openings of the through-holes 231. The cylindrical area 234e is filled with resin 25.

In this way, the cylindrical area 234e of the through-holes 23 are filled with resin, and when resist layers 27 are printed on the upper and lower surfaces of the board 20 in the post-process, printing materials do not flow through the through-holes 23 to the other surface side.

For example, thermosetting or ultraviolet-setting epoxy resin can be used for filling the through-holes 23.

The resist layers 27 are printed on the upper and lower surfaces of the board 20, with a conductor area 29c exposed. In the post-process, a terminal 31t of an electrical component 31 is soldered to the conductor area 29c. As a result, conductor area 29a to which no electrical component 31 is soldered, the land area 234r of the through-holes 23, and the resin 25 filling the through-holes 23, are covered with the resist layers 27 on the upper and lower surfaces of the board 20.

Further, silk layers 28 for indicating an arrangement of the electric component 31, etc. are printed on the resist layers 27.

Following that, the terminal 31t of the electrical component 31 is soldered to the conductor area 29c exposed on the upper surface of the board 20.

Next, the terminal structure 50 will be described according to the example.

As shown in FIG. 4A and FIG. 4B, the terminal structure 50 includes a pair of male power terminals 55 and a male signal terminal 57 provided on an electric tool (not shown), and a pair of female power terminals 62 and a female signal terminal 68 provided on the battery pack 10.

The pair of male power terminals 55 are respectively connected to a positive side power source line (not shown) and a negative side power source line (not shown) that are provided in the electric circuit of the electric tool. As shown in FIG. 4A, each male power terminal includes a terminal main body part 55m, a bent part 55k, and a cable connection part 55c. The terminal main body part 55m of each male power terminal 55 can be electrically connected to the mating female power terminal 62 of the battery pack 10, and it is formed in a longitudinally elongated strip-like configuration. And, the distal end part of the terminal main body part 55m is formed in a substantially wedge-like sectional configuration so as to gradually decrease in wall thickness at the distal end.

The bent part 55c and the lower part of the cable connection part 55c of each male power terminal 55 are embedded in the resin forming the housing of the electric tool, and these parts are fixed to the housing.

Hereinafter, the terminal main body part 55m of each male power terminal 55 will be termed the male power terminal 55.

The male signal terminal 57 can be connected to a signal cable (not shown) that is provided in the electric circuit of the electric tool, and it includes a terminal main body part 57m, a bent part 57k, and a cable connection part 57c. The terminal main body part 57m of the male signal terminal 57 can be electrically connected to the female signal terminal 68 of the battery pack 10, and is formed of a flat plate whose side surface is in an L-shaped configuration. And, the distal end part of the terminal main body part 57m is formed in a substantially wedge-like configuration so as to gradually decrease in wall thickness at the distal end side. Further, the bent part 57k and the lower side of the cable connection part 57c of the male signal terminal 57 are embedded in the resin forming the housing, and these parts are fixed to the housing as in the case of the male power terminals 55, Hereinafter, the terminal main body part 57m of the male signal terminal 57 will be termed the male signal terminal 57.

As shown in FIG. 4B, the pair of female power terminals 62 is mounted on the upper surface of the board 20, and are electrically connected to the power source conduction part (not shown) of the electric circuit of the board 20. The female signal terminal 68 is also mounted on the upper surface of the board so as to be situated on the left-hand side of the right-hand side female power terminal 62, and is electrically connected to the signal conductor part (not shown) of the electric circuit of the board 20.

As shown in FIG. 4B to FIG. 6, each of the female power terminals 62 includes a longitudinally elongated flat strip-like base part 62b fixed to the upper surface of the board 20, left and right support plate parts 63 and 64 bent at right angles in the vertical direction at both sides in the width direction (on the left side and the right side in the horizontal direction) of the base part 62b, and four elastic plate parts 65 and 66 respectively provided in the left and right support plate parts 63 and 64.

Figure 5:
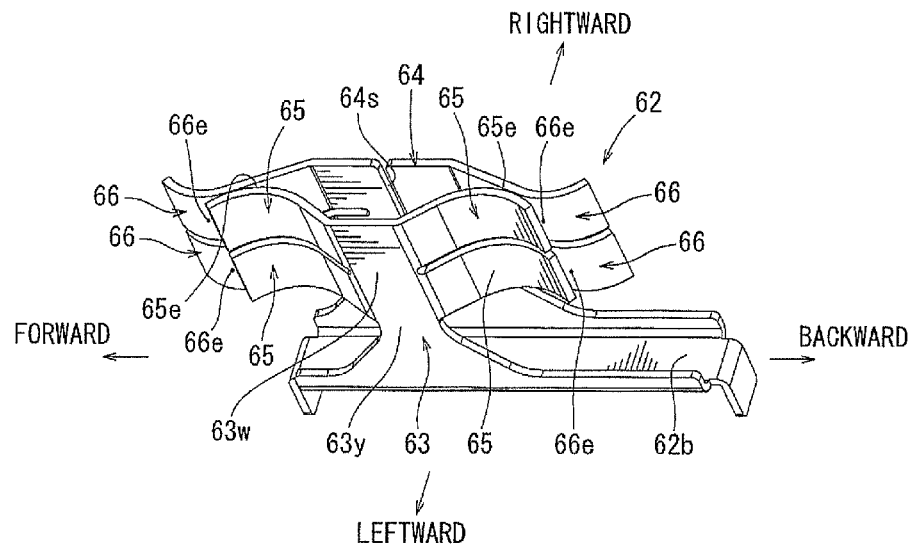
FIG. 5 is a perspective view of a female power terminal of the terminal structure.

As shown in FIG. 4B and FIG. 5, the left-hand side support plate part 63 of the female power terminal 62 includes a trapezoidal plate part 63y provided at the lower end part of the support plate part 63, and also includes a rectangular plate part 63w formed so as to extend upward from the trapezoidal plate part 63y. Further, two upper and lower elastic plate parts 65 extend horizontally forward from the rectangular plate part 63w of the left-hand side support plate part 63, and two upper and lower elastic plate parts 65 extend horizontally backward from the rectangular plate part 63w.

Figure 6:
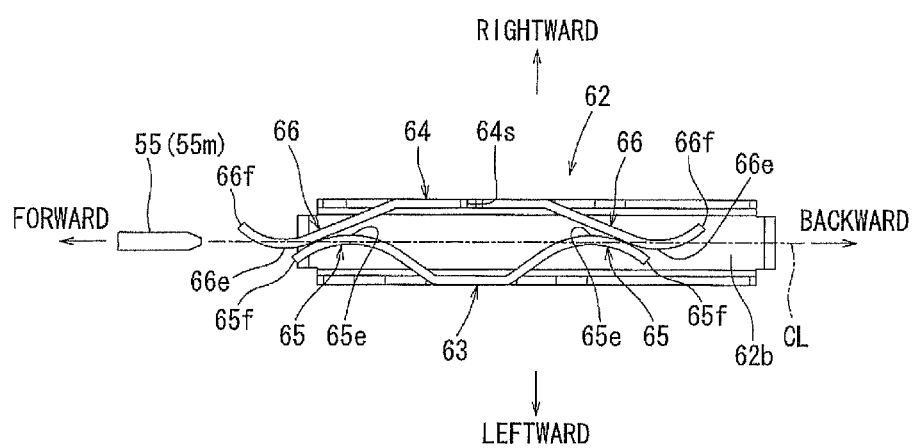
FIG. 6 is a plan view of the female power terminal of the terminal structure.

As shown in FIG. 6, the left-hand side elastic plate parts 65 are strip-like plates substantially arcuately curved from viewed above, and the four elastic plate parts 65 are formed in the same configuration and the same size. And, as shown in FIG. 6, the two upper and lower elastic plate parts 65 extending forward from the left-hand side support plate part 63 are bent by approximately 40 degrees to the right with respect to the support plate part 63. Further, the two upper and lower elastic plate parts 65 extending backward are bent by approximately 40 degrees to the left with respect to the support plate part 63. That is, the front and rear left-hand side elastic plate parts 65 are formed symmetrically with respect to a center line of the left-hand side support plate part 63.

Figure 7:
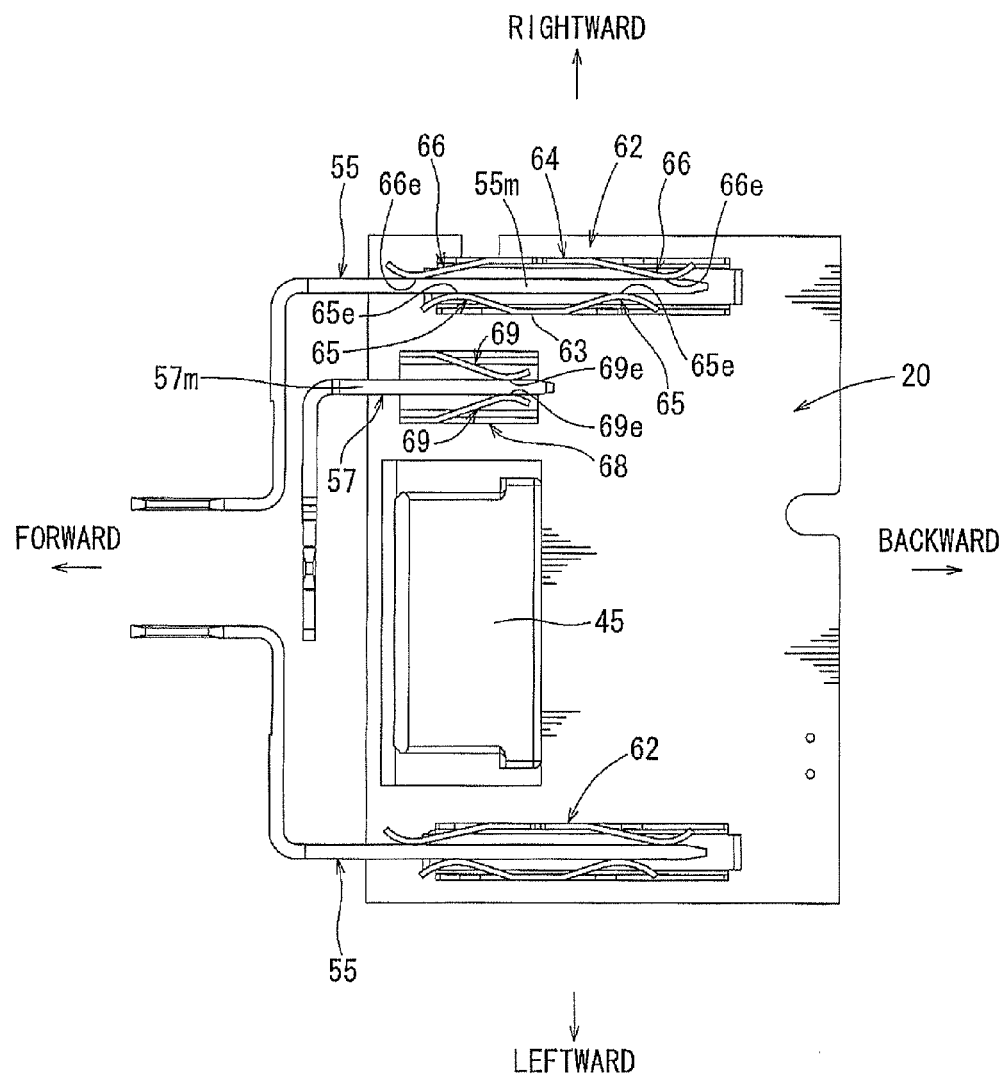
FIG. 7 is a plan view showing a connection state of the terminal structure.

Further, as shown in FIG. 6, arcuate convex surfaces 65e provided at the distal end parts of the front and rear left-hand side elastic plate parts 65 protrude to the right side with respect to the insertion center line CL (refer to dashed lines) of the male power terminal 55. And, as shown in FIG. 7, the arcuate convex surfaces 65e of the left-hand side elastic plate parts 65 are brought into contact with the left-hand side surface of the male power terminal 55. And, the distal ends 65f of the front and rear left-hand side elastic plate parts 65 are situated on the left-hand side of the insertion center line CL, and thus they do not block insertion and extraction of the male power terminal 55.

The arcuate convex surfaces 65e of the left-hand side elastic plate parts 65 become contact parts of the elastic plate parts 65. Hereinafter, the arcuate convex surfaces 65e will be termed contact parts 65e.

As shown in FIG. 5 and FIG. 6, the right-hand side support plate part 64 of the female power terminals 62 is arranged so as to face the left-hand side support plate part 63, and is formed to be larger in length than the left-hand side support plate parts 63 in the longitudinal direction. Further, at the center position of the right-hand side support plate part 64, there is formed a straight slit 64s extending from the upper end to the vicinity of the lower end of the plate part 64. Thus, the front side and rear side of the slit 64s of the right-hand side support plate part 64 can be elastically deformed separately.

Two upper and lower elastic plate parts 66 extend horizontally forward from the rectangular plate part 64w of the right-hand side support plate part 64, and similarly, two upper and lower elastic plate parts 66 extend horizontally backward therefrom.

As shown in FIG. 6, etc., the right-hand side elastic plate parts 66 are strip-like plates whose front end parts are substantially curved arcuately from viewed above, and the four elastic plate parts 66 are formed in the same configuration and the same size. And, the two upper and lower elastic plate parts 66 extending forward from the right-hand side support plate part 64 are bent by approximately 40 degrees to the left with respect to the front part of the support plate part 64. Further, the two upper and lower elastic plate parts 66 extending backward from the right-hand side support plate part 64 are bent by approximately 40 degrees to the left with respect to the rear part of the support plate part 64. That is, the front and rear right-hand side elastic plate parts 66 are provided symmetrically with respect to the center line of the right-hand side support plate part 64.

As shown in FIG. 6, arcuate convex surfaces 66e at the distal end parts of the right-hand side elastic plate parts 66 extending forward protrude to the left with respect to the insertion center line CL, in the front side of the left-hand side elastic plate parts 65. Further, the arcuate convex surfaces 66e at the distal end parts of the right-hand side elastic plate parts 66 extending backward protrude to the left with respect to the insertion center line CL, in the rear of the left-hand side elastic plate parts 65. And, as shown in FIG. 7, the arcuate convex surfaces 66e of the right-hand side elastic plate parts 66 are brought into contact with the right-hand side surface of the male power terminal 55. That is, a position where the arcuate convex surfaces 66e of the right-hand side elastic plate parts 66 are brought into contact with the right-hand side surface of the male power terminals 55 differs, in the insertion direction of the male power terminal 55, from a position where the arcuate convex surfaces 65e (contact parts) of the left-hand side elastic plate parts 65 are brought into contact with the left-hand side surface of the male power terminal 55

The distal ends 66f of the front and rear right-hand side elastic plate parts 66 are situated on the right-hand side with respect to the insertion center line CL, and thus they do not block insertion and extraction of the male power terminal 55.

That is, the arcuate convex surfaces 66e of the right-hand side elastic plate parts 66 become the contact parts of the elastic plate parts 66. Hereinafter, the arcuate convex surfaces 66e will be termed contact parts 66e.

As shown in FIG. 4B, the female signal terminal 68 includes a longitudinally elongated base part 68b fixed to the upper surface of the board 20, a pair of right and left support plate parts 68s bent at right angles in the vertical direction on both sides in the width direction (on the left side and the right side in the horizontal direction) of the base part 68b, and two elastic plate parts 69 respectively provided in the right and left support plate parts 68s.

The right and left elastic plate parts 69 of the female signal terminal 68 extend backward at the same height from the right and left support plate parts 68s, and the right and left elastic plate parts 69 are formed symmetrically on the right and left sides. That is, the left-hand side elastic plate part 69 is bent horizontally to the right with respect to the left-hand side support plate part 68s, and the right-hand side elastic plate part 69 is bent horizontally to the left with respect to the right-hand side support plate part 68s. Further, the right and left elastic plate parts 69 approach each other gradually as they extend backward. The distal end parts of the right and left elastic plate parts 69 are formed in a substantially arcuate configuration viewed from above, and arcuate convex surfaces 69e (contact parts 69e) are brought into contact with both side surfaces of the male signal terminal 57.

Next, the connection between the male power terminals 55 and the female power terminals 62, and between the male signal terminal 57 and the female signal terminal 68 will be described when the electric tool (not shown) is connected to the battery pack 10.

When connecting electric tool to the battery pack 10, the connection part of the electric tool is brought into fit-engagement with the right and left slide rails 15 (refer to FIG. 2) of the battery pack 10, and the electric tool slides backward along the slide rails 15. As a result, the male power terminals 55 and the male signal terminal 57 are respectively inserted into the power source guide slits 16p (refer to FIG. 2) and into the signal guide slit 16c of the battery pack 10. Then, the distal ends of the male power terminals 55 are brought into contact with the front parts of the female power terminals 62 mounted to the board 20 inside the battery pack 10, and similarly, the distal end of the male signal terminal 57 is brought into contact with the front part of the female signal terminal 68 mounted to the board 20.

And when the electric tool slides further in the backward direction with respect to the battery pack 10, the male power terminals 55 are inserted into the female power terminals 62 along the insertion center line CL, and the male signal terminal 57 is inserted into the female signal terminal 68.

As shown in FIG. 6, when the male power terminals 55 is inserted into the female power terminals 62 of the battery pack 10, the distal ends of the power source terminals 55 first come into contact with the front end surfaces of the upper and lower elastic plate parts 66 of the right-hand side front parts of the female power terminals 62, and the right-hand side elastic plate parts 66 are spread out to the right against the elastic force. And, the right-hand side support plate parts 64 supporting the right-hand side front parts of the elastic plate parts 66 are separated into the front and rear parts by the slits 64s, and thus the elastic deformation of the right-hand side front parts of the elastic plate parts 66 does not affect the right-hand side rear parts of the elastic plate parts 66. When the male power terminals 55 are inserted, the contact parts 66e of the right-hand side front parts of the elastic plate parts 66 of the female power terminals 62 come into contact with the right-hand side surfaces of the male power terminals 55, and are pressed against them by the elastic force of the elastic plate parts 66.

Next, the distal ends of the male power terminals 55 are brought into contact with the front end surfaces of the upper and lower elastic plate parts 65 of the left-hand side front parts of the female power terminals 62, and the elastic plate parts 65 of the left-hand side front parts are spread out to the left against the elastic force. And, when the male power terminals 55 are further inserted, the contact parts 65e of the elastic plate parts 65 of the left-hand side front parts of the female power terminals 62 are brought into contact with the left-hand side surfaces of the male power terminals 55, and are pressed against them by the elastic force of the elastic plate parts 65.

When the male power terminals 55 are further inserted, the contact parts 65e of the elastic plate parts 65 of the left-hand side rear parts of the female power terminals 62 come into contact with the left-hand side surfaces of the male power terminals 55, and the elastic plate parts 65 of the left-hand side rear parts are spread out to the left against the elastic force by the force with which the male power terminals 55 are inserted. As a result, the contact parts 65e of the elastic plate parts 65 of the left-hand side rear parts are pressed against the left-hand side surfaces of the male power terminals 55 by the elastic force of the elastic plate parts 65.

When the male power terminals 55 are further inserted, the contact parts 66e of the elastic plate parts 66 of the right-hand side rear parts of the female power terminals 62, and the elastic plate parts 66 of the right-hand side rear parts are spread out to the right against the elastic force by the force with which the male power terminals 55 are inserted. As a result, the contact parts 66e of the elastic plate parts 66 of the right-hand side rear parts are pressed against the right-hand side surfaces of the male power terminals 55 by the elastic force of the elastic plate parts 66.

As a result, as shown in FIG. 7, the male power terminals 55 and the female power terminals 62 are electrically connected to each other.

When the male signal terminal 57 is inserted into the female signal terminal 68 of the battery pack 10, the male signal terminal 57 spreads out from within the right and left elastic plate parts 69 of the female signal terminal 68 against the elastic force, and the contact parts 69e of the right and left elastic plate parts 69 are pressed against the right and left side surfaces of the male signal terminal 57. As shown in FIG. 7, in this state, the male signal terminal 57 and the female signal terminal 68 are electrically connected to each other.

As described above, the male power terminals 55 correspond to the male terminal of the present invention, and the female power terminals 62 correspond to the female terminal of the present invention.

In the terminal structure 50 according to the example, a position of the left-hand side surfaces of the male terminals 55 worn away over time as a result of the contact with the left-hand side elastic plate parts 65 of the female power terminals 62 differs from a position of the right-hand side surfaces 55 of the male power terminals 55 worn away over time as a result of the contact with the right-hand side elastic plate parts 66, in the insertion direction of the male power terminals 55. That is, the worn position of the left-hand side surface and the worn position of the right-hand side surface in the male power terminal 55 caused by the elastic plate parts 65, 66 differ each other in the longitudinal direction. Accordingly, for example, even when either position of the male power terminal 55 is worn away by half or more by the one elastic plate parts, it will be still possible to use the terminal structure 50. That is, the terminal structure 50 will have a longer operating life than ever before.

Further, the contact parts 65e of the left-hand side elastic plate parts 65 of the female power terminals 62 protrude to the right beyond the center line CL that corresponds to the direction in which the male power terminals 55 are inserted, and the contact parts 66e of the right-hand side elastic plate parts 66 protrude to the left beyond the center line CL. Thus, it is possible to increase the pressing force of the elastic plate parts 65 and 66 with respect to the male power terminals 55. As a result, it is possible to prevent contact failure between the male power terminals 55 and the female power terminals 62.

Further, the right-hand side elastic plate parts 66 of the female power terminal 62 are supported by one support plate part 64, and the contact parts 66e are provided respectively in the front and rear sides of the support plate part 64, and the left-hand side elastic plate parts 65 are similarly supported by one support plate part 63, and the contact parts 65e are respectively provided on the front and rear sides of the support plate part 63. Thus, as compared with a case in which each elastic plate part 65 and 66 provided with one contact part 65e and 66e is supported by one support plate part and in which the elastic plate parts 65, 66 and the support plate parts are arranged in line in the insertion direction of the male power terminal (in the longitudinal direction), it is possible to reduce a longitudinal size of the female power terminal 62.

Further, the right-hand side support plate parts 64 of the female power terminals 62 are provided with the straight slits 64s. Because of this, a movement of the front side contact parts 66e of the elastic plate parts 66 is not transmitted to the rear side contact parts 66e and a movement of the rear side contact parts 66e is not transmitted to the front side contact parts 66e. That is, the right-hand side support plate part 64 is configured such that a force is not transmitted in the longitudinal direction due to the straight slits 64s. In this way, the right-hand side support plate part 64 functions in a manner similar to that of the two independent front and rear support plate parts.

In the following, a terminal structure 70 according to another example will be described with reference to FIG. 8 and FIG. 9.

The construction of the terminal structure 70 is a modified one of the terminal structure 50. Other than the female power terminals 62, the terminal structure 70 has the same construction as the terminal structure 50.

Figure 8:
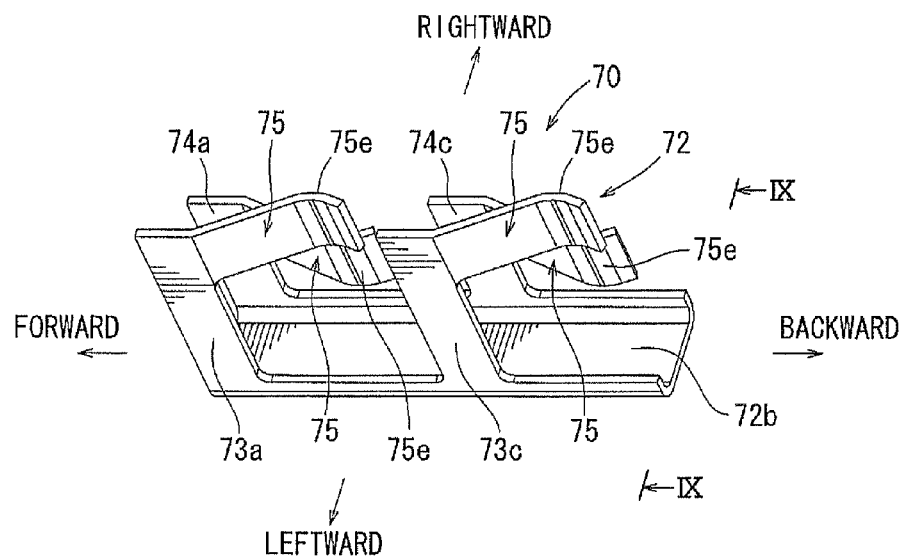
FIG. 8 is a perspective view of a female power terminal of a terminal structure according to another example.
Figure 9:
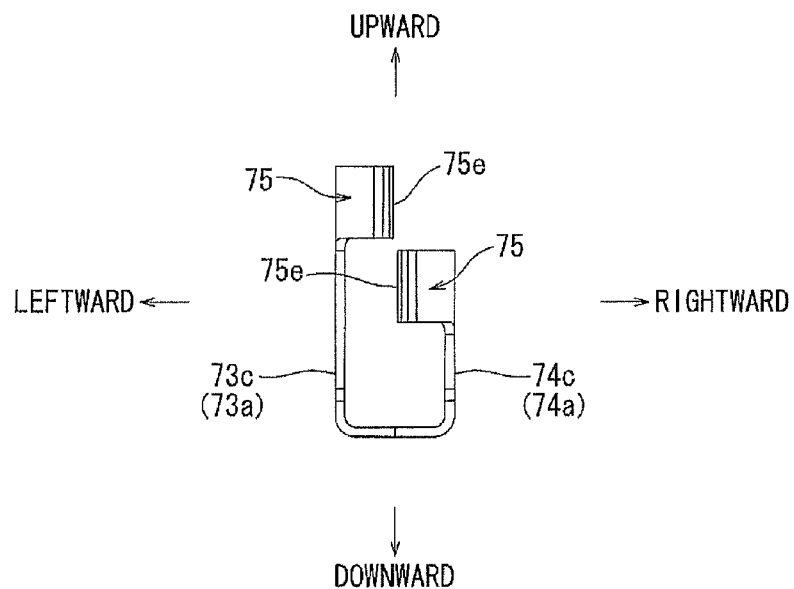
FIG. 9 is a sectional view taken along arrows IX-IX of FIG. 8.

As shown in FIG. 8, a female power terminal 72 of the terminal structure 70 is provided with a longitudinally elongated, strip-like base part 72 fixed to the upper surface of the board 20, and also provided with a left-hand front side support plate part 73a, a left-hand central side support plate part 73c, a right-hand front side support plate part 74a, and a right-hand central side support plate part 74c, which are formed by bending at right angles in the vertical direction on both sides in the width direction (on the left side and the right side in the horizontal direction) of the base part 72b. The left-hand front side support plate part 73a, the left-hand central side support plate part 73c, the right-hand front side support plate part 74a, and the right-hand central side support plate part 74c, are upwardly extending rectangular flat plates. As shown in FIG. 9, the left-hand front side support plate part 73a and the left-hand central side support plate part 73c are formed to be higher than the right-hand front side support plate part 74a and the right-hand central side support plate part 74c. Further, the left-hand front side support plate part 73a is configured to face the right-hand front side support plate part 74a, and the left-hand central side support plate part 73c is configured to face the right-hand central side support plate part 74c face.

Further, an elastic plate part 75 extends horizontally backward from the upper end part of each of the support plate parts 73a, 73c, 74a, and 73c. As described above, the left-hand front side support plate part 73a and the left-hand central side support plate part 73c are configured to be higher than the right-hand front side support plate part 74a and the right-hand central side support plate part 74c, the height of the right and left elastic plate parts 75 differ from each other as shown in FIG. 9.

The left-hand front side elastic plate part 75 is bent horizontally to the right with respect to the left-hand side support plate part 73a, and the left-hand central side elastic plate part 75 is bent horizontally to the right with respect to the left-hand central side support plate part 73c. The right-hand front side elastic plate part 75 is bent horizontally to the left with respect to the right-hand side support plate part 74a, and the right-hand central side elastic plate part 75 is bent horizontally to the left with respect to the right-hand central side support plate part 74c. And, the right and left elastic plate parts 75 are formed so as to gradually approach each other as they extend backward. The distal end parts of the right and left elastic plate parts 75 are formed in a substantially arcuate configuration viewed from above, and arcuate convex surfaces 75e (contact parts 75e) come into contact with both side surfaces of the male power terminal 55.

As a result, a position of the left-hand side surface of the male power terminal 55 worn away over time as a result of the contact with the left-hand side elastic plate parts 75 differs from a position of the right-hand side surface of the male power terminal 55 worn away over time as a result of the contact with the right-hand side elastic plate parts 75, in the height direction (the direction perpendicular to the insertion direction of the male power terminal 55). That is, the worn position of the left-hand side surface and that of the right-hand side surface of the male power terminal 55 caused by the left and right elastic plate parts 75 are vertically deviated from each other. Accordingly, for example, even when either position of the male power terminal 55 is worn away by half or more by one elastic plate part 75, it will be still possible to use the terminal structure 70.

In the following, a terminal structure 80 according another example of the present invention will be described with reference to FIG. 10 and FIG. 11.

The construction of the terminal structure 80 is a modified one of the terminal structure 50. Other than the female power terminals 62, the terminal structure 80 has the same construction as the terminal structure 50.

Figure 10:
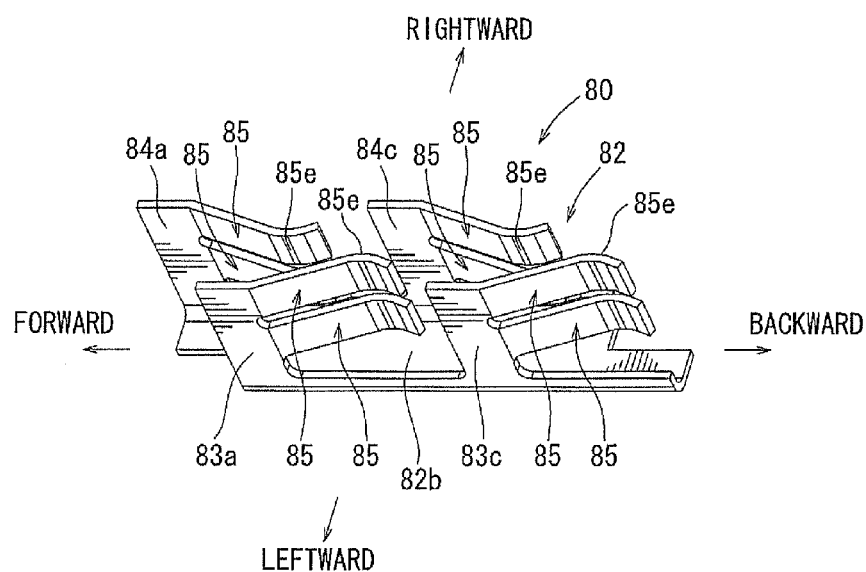
FIG. 10 is a perspective view of a female power terminal of a terminal structure according to another example.
Figure 11:
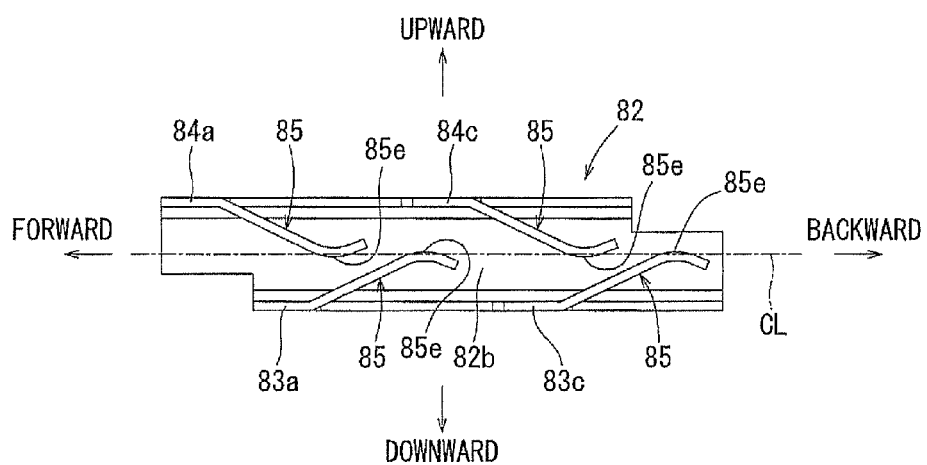
FIG. 11 is a plan view of the female power terminal of the terminal structure.

As shown in FIG. 10 and FIG. 11, a female power terminal 82 of the terminal structure 80 according to the example is provided with a longitudinally elongated, strip-like base part 82b fixed to the upper surface of the board 20, and also provided with a left-hand front side support plate part 83a, a left-hand central side support plate part 83c, a right-hand front side support plate part 84a, and a right-hand central side support plate part 84c, which are formed by bending at right angles in the vertical direction on both sides in the width direction (on the left side and the right side in the horizontal direction) of the base part 82b.

The left-hand front side support plate part 83a, the left-hand central side support plate part 83c, the right-hand front side support plate part 84a, and the right-hand central side support plate part 84c, are upwardly extending rectangular flat plates, and are formed in the same configuration and in the same size. Further, the left-hand front side support plate part 83a is deviated backward in the longitudinal direction by a predetermined distance from the right-hand front side support plate part 84a, and in the same way the left-hand central side support plate part 83c is deviated backward in the longitudinal direction by a predetermined distance from the right-hand central side support plate part 84c.

Two upper and lower elastic plate parts 85 having the same configuration extend horizontally backward in the longitudinal direction from the upper end part of each support plate parts 83a, 83c, 84a, and 84c. As described above, the left-hand front side support plate part 83a, the left-hand central side support plate part 83c, the right-hand front side support plate part 84a, and the right-hand central side support plate part 84c, are formed in the same size, and thus the right and left elastic plate parts 85 have the same height.

The left-hand front side elastic plate parts 85 are bent horizontally to the right with respect to the left-hand front side support plate part 83a, and the left-hand central side elastic plate parts 85 are bent horizontally to the right with respect to the left-hand central side support plate part 83c. Further, the right-hand front side elastic plate parts 85 are bent horizontally to the left with respect to the right-hand front side support plate part 84a, and the right-hand central side elastic plate parts 85 are bent horizontally to the left with respect to the right-hand central side support plate part 84c. And, the right and left elastic plate parts 85 gradually approach each other as they extend backward, with deviated from each other in the longitudinal direction, as shown if FIG. 11. The distal end parts of the right and left elastic plate parts 85 are formed in a substantially arcuate configuration viewed from above, and arcuate convex surfaces 85e (contact parts 85e) come into contact with both side surfaces of the male power terminal 55.

As a result, a position of the left-hand side surface of the male power terminal 55 worn away over time as a result of the contact with the left-hand side elastic plate parts 85 of the female power terminal 82, and a position of the right-hand side surface of the male power terminal 55 worn away over time as a result of the contact with the right-hand side elastic plate parts 85 of the female power terminal 82, are deviated from each other by a predetermined distance in the longitudinal direction (the insertion direction of the male power terminal 55). Accordingly, the worn position of the left-hand side surface and the worn position of the right-hand side surface of the male power terminal 55 caused by the right and left elastic plate parts 85 respectively are deviated in the longitudinal direction. And thus, for example, even when the male power terminal 55 is worn away by half or more in thickness by one elastic plate part 85, it is still possible to use the terminal structure 80.

In the following, a terminal structure 90 according to another example will be described with reference to FIG. 12 to FIG. 20. The male power terminals 55 and the male signal terminal 57 are the same as those of the first example.

Figure 12:
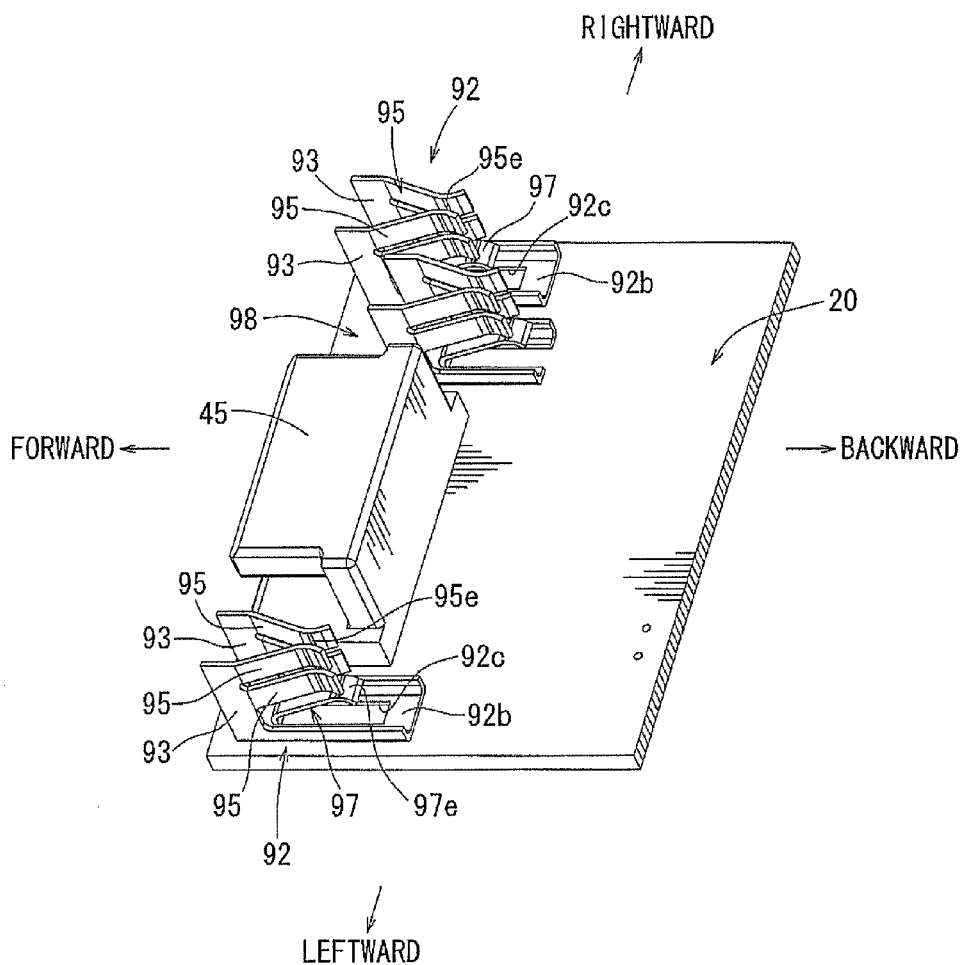
FIG. 12 is a perspective view of a terminal structure according to another example.

As shown in FIG. 12, a female power terminals 92 is mounted on the upper surface of the board 20, and the electric circuit of the board 20 is electrically connected to a power conductor part (not shown) of the electric circuit. A female signal terminal 98 is mounted on the upper surface of the board 20 so as to be at the left-hand side of and adjacent to the right-hand side female power terminal 92, and is electrically connected to a signal conductor part (not shown) of the board 20.

Figure 15:
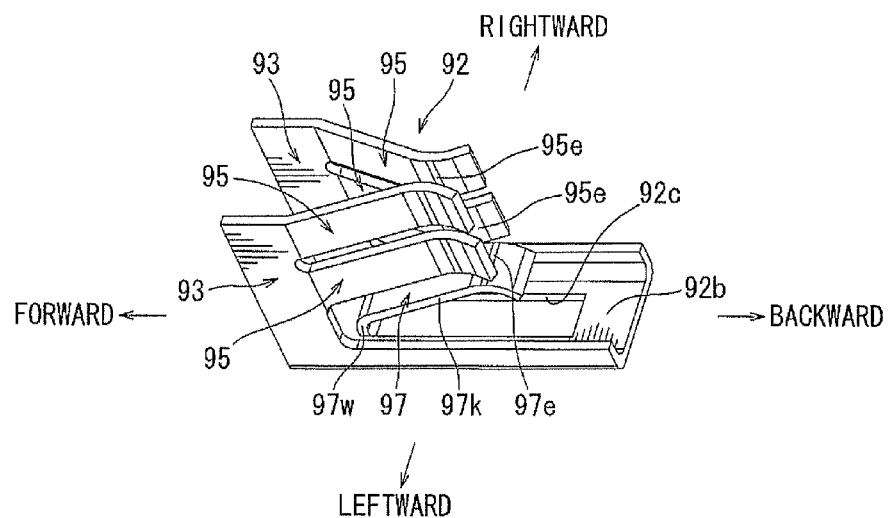
FIG. 15 is a perspective view of a female power terminal of the terminal structure.
Figure 16:
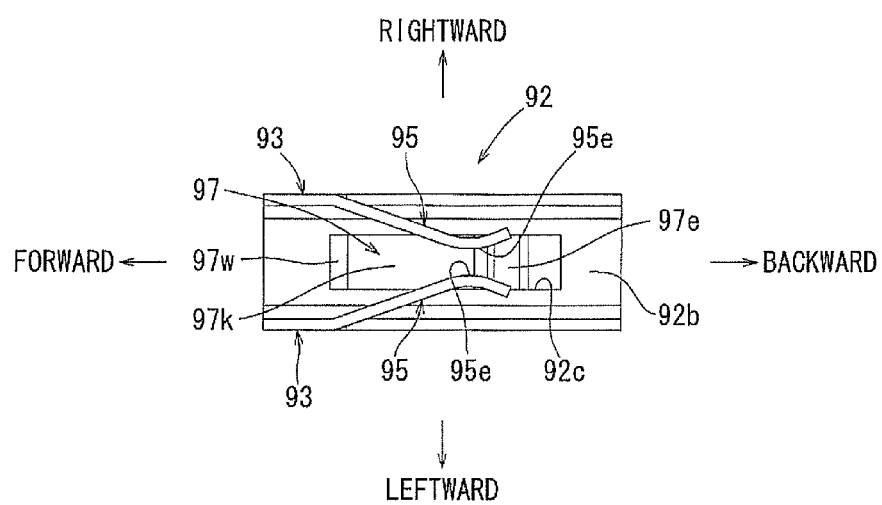
FIG. 16 is a plan view of the female power terminal of the terminal structure.
Figure 17:
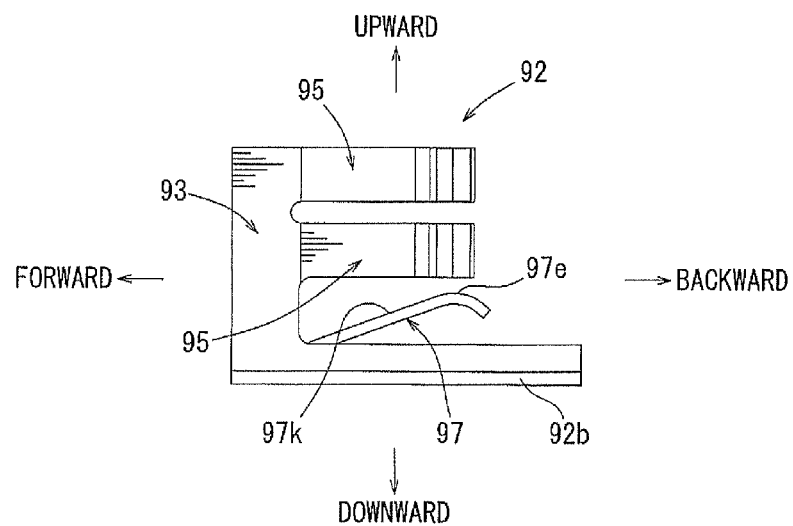
FIG. 17 is a side view of the female power terminal of the terminal structure.

As shown in FIG. 15 to FIG. 17, the female power terminals 92 is provided with a longitudinally elongated flat-strip-like base part 92b fixed to the upper surface of the board 20, right and left support plate parts 93 bent at right angles in the vertically direction at both sides in the width direction of the base part 92b (at the right side and left side), and two sets of elastic plate parts 95, with each right and left support plate parts 93 provided with two elastic plate parts 95.

As shown in FIG. 15, etc., the right and left support plate parts 93 are upwardly extending rectangular flat plates, and are formed such that the right and left support plate parts 93 are of the same height. And, the right and left support plate parts 93 face each other.

The elastic plate parts 95 provided on the right and left support plate parts 93 extend horizontally backward having the same height, with the right and left elastic plate parts 93 formed symmetrically. That is, the left-hand side elastic plate parts 95 are bent horizontally to the right with respect to the left-hand side support plate part 93, and the right-hand side elastic plate parts 95 are bent horizontally to the left with respect to the right-hand side support plate part 93. Further, the right and left elastic plate parts 95 gradually approach each other as they extend backward in the longitudinal direction. The distal end parts of the right and left elastic plate parts 95 are formed in a substantially arcuate configuration viewed from above, and on the sides facing each other arcuate convex surfaces 95e are formed. And, the right and left arcuate convex surfaces 95e (contact parts 95e) come into contact with the surfaces of the male power terminal 55.

A distance between the contact parts 95e of the right and left elastic plate parts 95 is set to be sufficiently smaller than the thickness of the male power terminal 55. Accordingly, when the male power terminal 55 is inserted, the elastic plate parts 95 are deformed and pressed apart.

Figure 14:
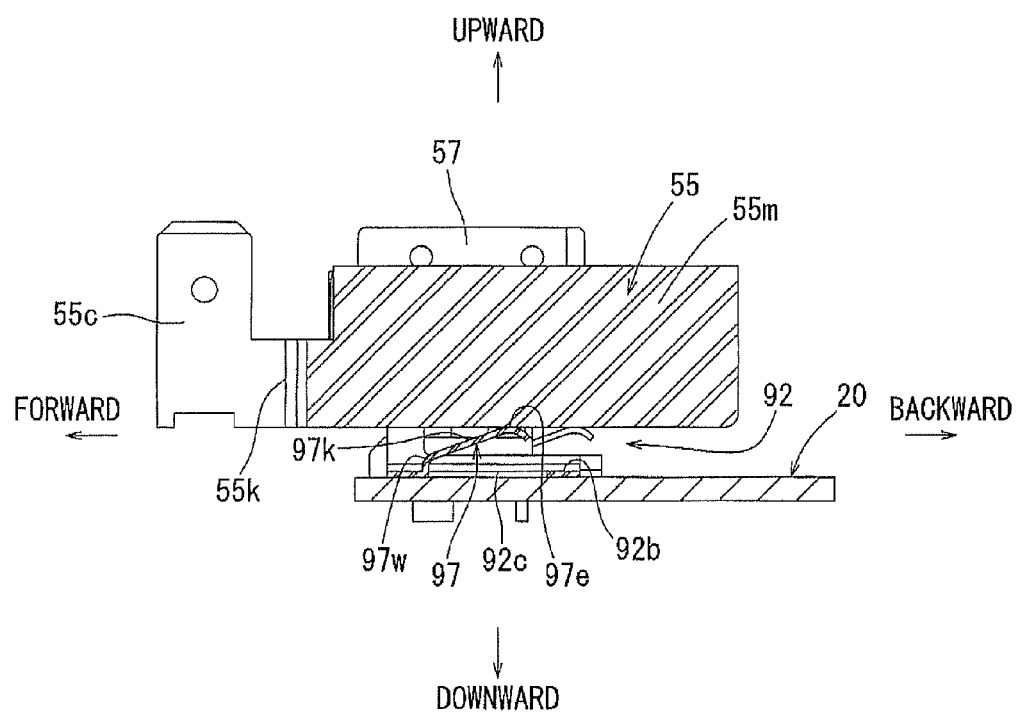
FIG. 14 is a sectional view taken along arrows line V-V of FIG. 13.

As shown in FIG. 15, the base part 92*b* of the female power terminal 92 is provided with a lower elastic plate part 97 configured to come into contact with a lower surface of the male power terminal 55. The lower elastic plate part 97 is formed by cutting the bottom surface of the base part 92*b* on three sides in conformity with the configuration of the lower elastic plate part 97 and by upwardly bending the uncut proximal end part. That is, the lower elastic plate part 97 is provided with a proximal end part 97*w* (refer to FIG. 15) bent at right angles with respect to the base part 92*b*, an inclined plate part 97*k* obliquely bent with respect to the proximal end part 97*w*, and an arcuate protrusion 97*e* formed by curving the distal end part of the inclined plate part 97*k* so as to make it upwardly convex as shown in FIG. 17. And, as shown in FIG. 14, the upper surface of the arcuate protrusion 97*e* of the lower elastic plate part 97 is pressed against the lower surface of the male power terminal by the elastic force of the lower elastic plate part 97. That is, the lower elastic plate part 97 deforms elastically when the male power terminal 55 is inserted.

As shown in FIG. 15, a rectangular opening 97*c* is formed in the bottom surface of the base part 92*b* of the female power terminal 92 since the lower elastic plate part 97 is produced as described above.

The female signal terminal 98 is formed in substantially the same structure as the female power terminal 92.

When the male power terminal 55 is inserted into the mating female power terminal 92, the lower surface of the distal end of the male power terminal 55 first comes into contact with the inclined plate part 97*k* of the lower elastic plate part 97 of the female power terminal 92, and pushes down the inclined plate part 97*k* against the elastic force by the insertion force. Next, the male power terminal 95 spreads out the right and left elastic plate parts 95*e* against the elastic force, and the right and left contact parts 95*e* of the right and left elastic plate parts 95 are respectively pressed against the right and left side surfaces of the male power terminal 55. Further, when the male power terminal 55 is further inserted into the female power terminal 92, the contact part 97*e* of the lower elastic plate part 97 is pressed against the lower surface of the male power terminal 55 (refer to FIG. 14).

Figure 13:
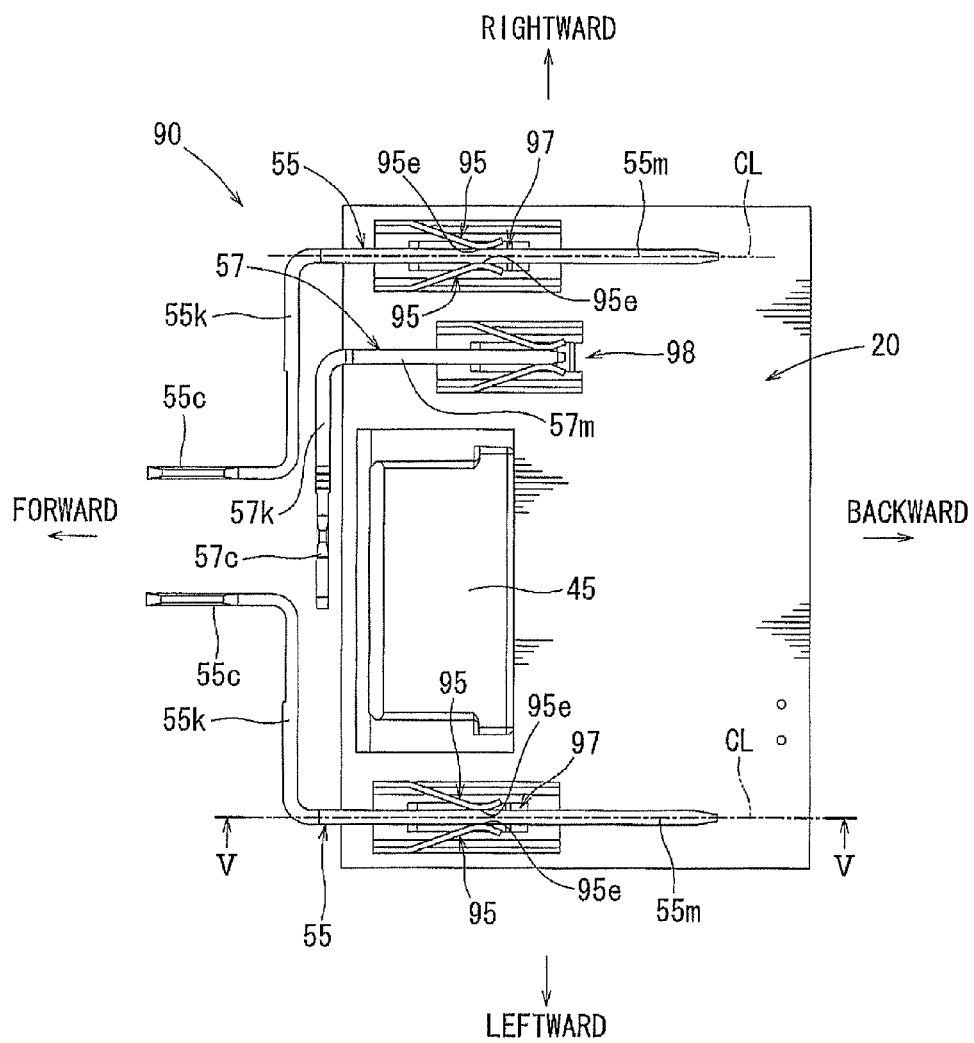
FIG. 13 is a plan view showing a connection state of the terminal structure.

As shown in FIG. 13 and FIG. 14, when the male power terminal 55 is inserted into the female power terminal 92 up to a predetermined position, the connection between the male power terminal 55 and the female power terminal 92 is completed.

Further, similar to the male power terminal 55 and the female power terminal 92, the male signal terminal 57 and the female signal terminal 98 are also electrically connected to each other.

In this way, the male power terminal 55 and the male signal terminal 57 correspond to the male terminal of the present invention, and the female power terminal 92 and the female signal terminal 98 correspond to the female terminal of the present invention. Further, the right and left elastic plate parts 95 of the female power terminal 92 correspond to the at least one set of elastic plate parts of the present invention, and the lower elastic plate part 97 corresponds to the other elastic plate part of the present invention.

In the terminal structure 90 according to the example, when the male power terminal 55 is inserted between the left and right elastic plate parts 95 in the insertion direction, that is, when both side surfaces of the male power terminal 55 are pressed by the elastic plate parts 95, the lower surface of the male power terminal 55 is also pressed by the lower elastic plate part 97. In this way, due to the lower elastic plate part 97 (the other elastic plate part), it is possible to increase the contact areas between the male power terminal 55 and the female power terminal 92, so that it is possible to reduce the electric current that flows through one contact part, which increases an operating life of the terminal structure 90.

Further, due to the construction in which both side surfaces of the male power terminal 55 are pressed by the two sets of elastic plate parts 95 of the female power terminal 92, and in which the lower surface of the male power terminal 55 is pressed by the lower elastic plate part 97 (the other elastic plate part), it is possible to arrange the two sets of elastic plate parts 95 and the lower elastic plate part 97 substantially at the same position in the insertion direction of the male power terminal 55. That is, there is no need to provide the two sets of elastic plate parts 95 of the female power terminal 92 and the lower elastic plate part 97 in line in the insertion direction of the male power terminal 55. Thus, the female power terminal 92 is not elongated in the insertion direction of the male power terminal 55, making it possible to limit the installation space for the female power terminal 92. Further, since the female power terminal 92 is not elongated in the insertion direction, there is no need for the male power terminal 55 to form so as to be elongated as well in the insertion direction.

Figure 18:
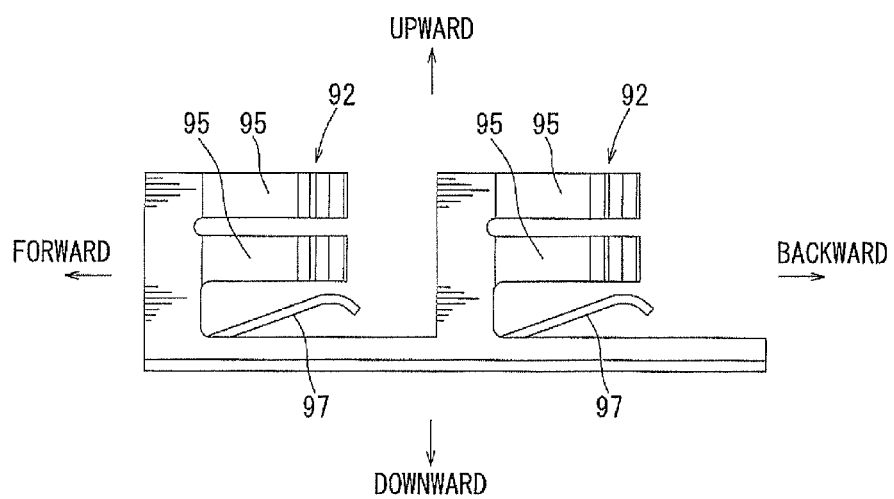
FIG. 18 is a side view of a female power terminal according to a modified example.

In the above example, one female power terminal 92 is provided for one male power terminal 55. However, it is also possible, as shown in FIG. 18, to dispose two female power terminals 92 in line in the insertion direction of the male power terminal 55.

Figure 19:
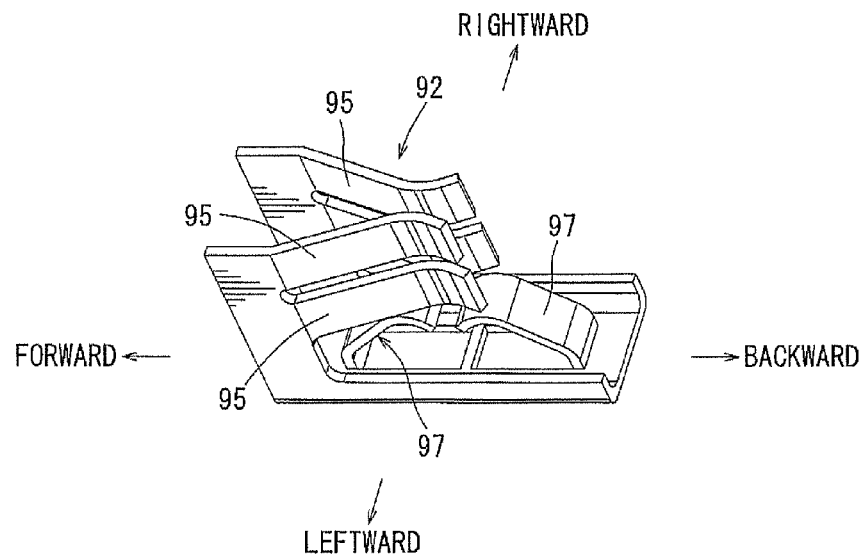
FIG. 19 is a perspective view of a female power terminal according to another modified example.
Figure 20:
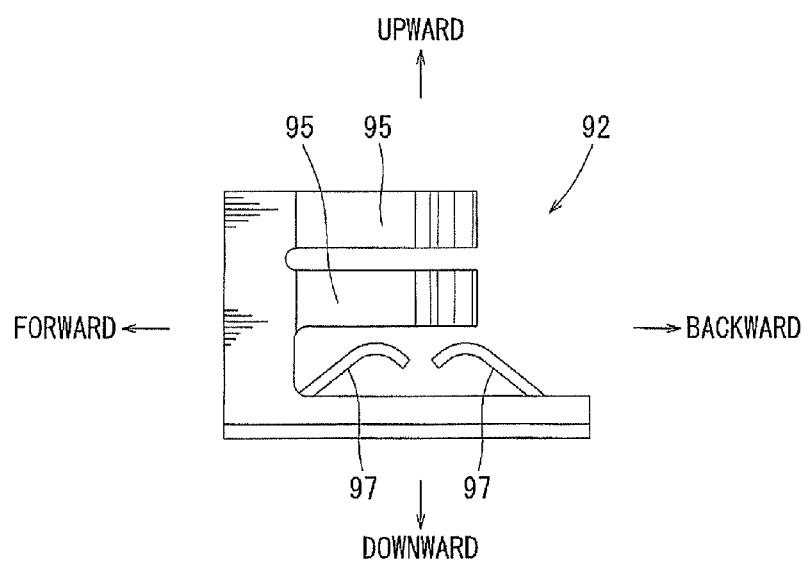
FIG. 20 is a side view of the female power terminal according to another modified example.

Further, in FIG. 15, one lower elastic plate part 97 is provided at the base part 92*b* of the female power terminal 92. However, it is also possible, as shown in FIG. 19 and FIG. 20, to provide two lower elastic plate parts 97 in the insertion direction of the male power terminal 55.

This arrangement makes it possible to further increase the contact areas between the male power terminal 55 and the female power terminal 92, which increases an operating life of the terminal structure 90 and improves connection reliability.

In the following, a terminal structure 90' according to another example of the present invention will be described with reference to FIG. 21 to FIG. 23.

The construction of the terminal structure 90' is a modified one of the terminal structure 90. Other than the female power terminals 92, the terminal structure 90' has the same construction as the terminal structure 90.

Figure 21:
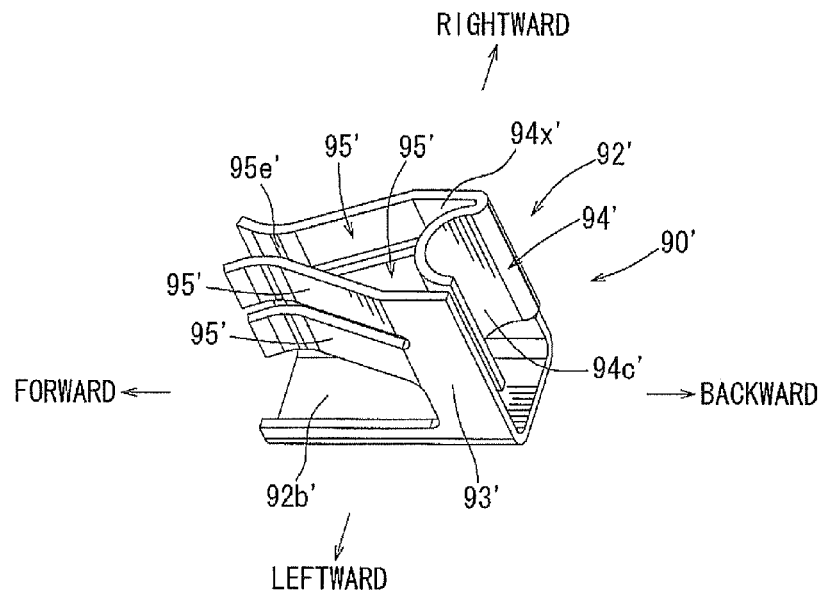
FIG. 21 is a perspective view of a female power terminal of a terminal structure according to another example.
Figure 22:
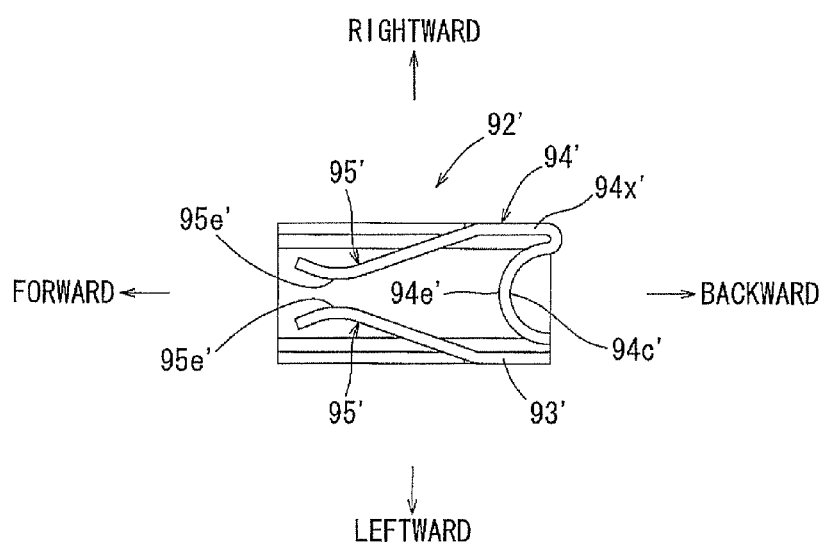
FIG. 22 is a plan view of the female power terminal of the terminal structure.
Figure 23:
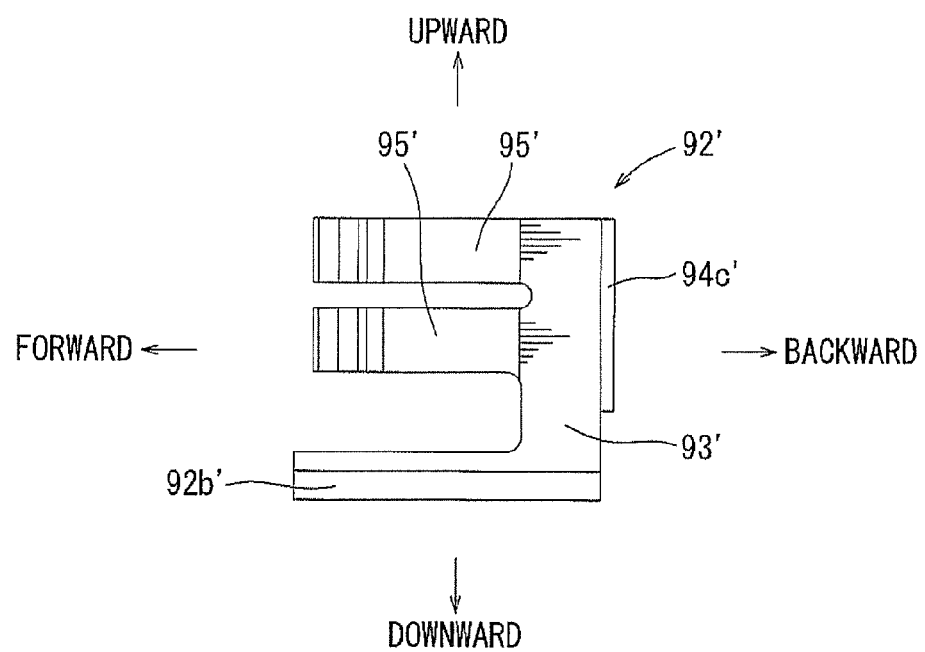
FIG. 23 is a side view of the female power terminal of the terminal structure.
Figure 24:
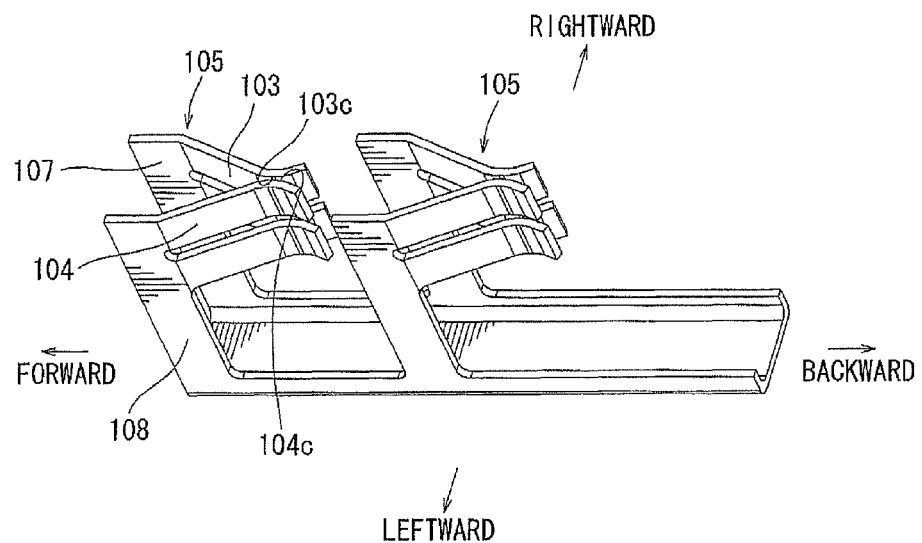
FIG. 24 is a perspective view showing a female terminal of a known terminal structure.
Figure 25:
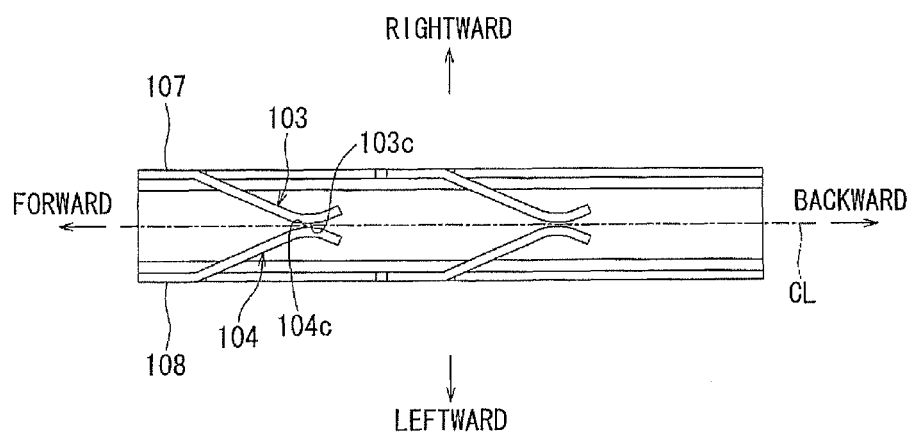
FIG. 25 is a plan view showing the female terminal of the known terminal structure.
Figure 26:
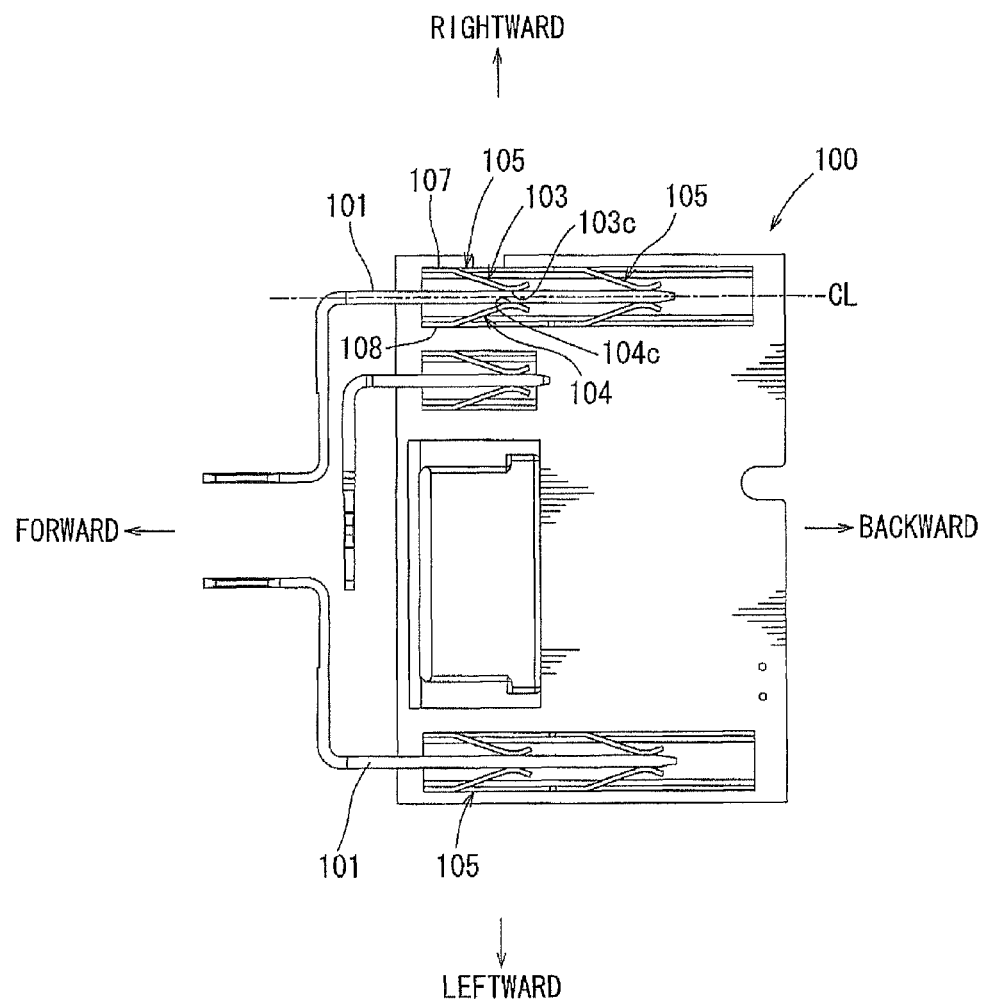
FIG. 26 is a plan view showing a connection state of the known terminal structure.

As shown in FIG. 21 to FIG. 23, a female power terminal 92' of the terminal structure 90' according to the example is provided with a longitudinally elongated flat strip-like base part 92*b*' fixed to the upper surface of the board 20, a left-hand side support plate part 93' and a right-hand side support plate part 94' that are bent at right angles in the vertical direction at both sides in the width direction (at the right side and the left side) of the base part 92*b*', and two elastic plate parts 95' provided on the left and right support plate parts 93' and 94' respectively.

As shown in FIG. 21, the left-hand side support plate part 93' is formed as an upwardly extending rectangular flat plate. The right-hand side support plate part 94' includes a rectangular flat plate part 94*x*' that is formed to face the left-hand side support plate part 93' with the same height as the same, and a semi-circular wall part 94*c*' that is folded back at the rear end position of the rectangular flat plate part 94*x*'. The semi-circular wall part 94*c*' is arranged so as to cover a space between the left-hand side support plate part 93' and the rectangular flat plate part 94*x*' of the right-hand side support plate part 94', and as shown in FIG. 21, it is formed in a semi-circular sectional configuration so as to be forwardly convex. And, the distal end of the male power terminal 55 can be brought into contact with the semi-circular wall part 94c' of the right-hand side support plate part 94'. That is, the forwardly convex arcuate surface of the semi-circular wall part 94c' of the right-hand side support plate part 94' becomes a contact part 94e' to be brought into contact with the male power terminal 55 (refer to FIG. 21).

The left and right support plate parts 93' and 94' are provided with the elastic plate parts 95' that extend forward in the longitudinal direction, each elastic plate part 95' of the left and right support plate parts 93' and 94' having the same height respectively. The right and left elastic plate parts 95' are formed symmetrically, and the left-hand side elastic plate parts 95' are bent horizontally to the right with respect to the left-hand side elastic plate part 93'. Further, the right-hand side elastic plate parts 95' are bent horizontally to the left with respect to the rectangular flat plate part 94x' of the right-hand side support plate part 94'. That is, the right and left elastic plate parts 95' are formed so as to gradually approach each other as they extend forward in the longitudinal direction. Further, the distal end parts of the right and left elastic plate parts 95' are formed in a substantially arcuate configuration viewed from above, and on the sides facing each other arcuate convex surfaces 95e' are formed.

Accordingly, by inserting the male power terminal 55 between the right and left elastic plate parts 95' of the female power terminal 92', the arcuate convex surfaces 95e' of the right and left elastic plate parts 95' are pressed against the right and left side surfaces of the male power terminal 55 by the elastic force of the elastic plate parts 95'. When the male power terminal 55 is inserted up to a limit position, the distal end of the male power terminal 55 comes into contact with the contact part 94e' of the semi-circular wall part 94c' of the right-hand side support plate part 94', and the connection between the male power terminal 55 and the female power terminal 92' is completed.

In this way, due to the semi-circular wall part 94c' of the male power terminal 92', it is possible to increase the contact areas between the male power terminal 55 and the female power terminal 92', which reduces an electric current that flows through one contact part and increase an operating life of the terminals.

Further, it is possible to limit a size of the male power terminal 55 and an installation space for the female power terminal 92'.

The semi-circular wall part 94c' of the right-hand side support plate part 94' corresponds to the other elastic plate part of the present invention.

The above constructions may not be limited by the above-described example and various changes may be made without departing from the scope of the invention. For example, in the above examples shows that the invention is applied to the terminal structure 50, 70, 80, 90, 90' including the male power terminals 55 and the female power terminals 62, 72, 82, 92, 92'. However, it is also possible to apply the present invention to the male signal terminal 57 and the female signal terminal 68.

Further, as described above, the examples show that the lower elastic plate part 97 (the other elastic plate part) is provided at the base part 92b of the female power terminal 92, and the semi-circular wall part 94c' (the other elastic plate part) is provided in the right-hand side support plate part 94' of the female power terminal 92'. However, it is also possible for a single female power terminal to provide with both the lower elastic plate part 97 and the semi-circular wall part 94c'.

Further, the above examples show that the male power terminals 55 are provided in the electric tool and the female power terminals 62, 72, 82, 92, 92' are provided in the battery pack 10. However, it is also possible to provide the female power terminals 62, 72, 82, 92, 92' in the electric tool and to provide the male power terminals 55 in the battery pack 10.

Further, the above examples show that the present invention is applied to the terminal structure 50, etc. between the electric tool and the battery pack 10. However, the present invention is also applied to a terminal structure between the battery pack 10 and a charger.

That is, it is possible to provide the male power terminals 55 in the charger, and to provide the female power terminals 62, 72, 82, 92, 92' in the battery pack 10. Alternatively, it is also possible to provide the female power terminals 62, 72, 82, 92, 92' in the charger, and to provide the male power terminals 55 in the battery pack 10.

I claim:

1. A terminal structure, comprising a male terminal and a female terminal, wherein the female terminal includes at least one set of elastic plate parts, the terminal structure configured such that the male terminal is inserted between the at least one set of elastic plate parts of the female terminal in a predetermined insertion direction to cause each side surface of the male terminal to be pressed by the elastic plate parts due to the elastic force of the elastic plate parts, whereby the male terminal and the female terminal are electrically connected to each other, wherein:

the male terminal has a plate-like shape and is configured to come into contact with the female terminal on a first side surface and a second side surface of the male terminal, the first side surface and the second side surface of the male terminal facing away from each other; and first and second positions of the first side surface of the male terminal with which first and second contact parts of the first elastic plate part are held in contact with are offset from third and fourth positions of the second side surface of the male terminal with which third and fourth contact parts of the second elastic plate part are held in contact with, such that the third and fourth positions of the male terminal are within the first and second positions of the male terminal in the insertion direction of the male terminal.

2. The terminal structure according to claim 1, wherein:
in a state in which the male terminal is not inserted into the female terminal, the contact part of the first elastic plate part of the female terminal extends toward the second elastic plate part over a center line along which the male terminal is inserted, and the contact part of the second elastic plate part of the female terminal extends toward the first elastic plate part over the center line.

3. The terminal structure according to claim 1, wherein:
the first elastic plate part of the female terminal is supported by a support plate part, on the front side and the rear side of which the contact parts of the first elastic plate part are respectively arranged; and
the second elastic plate part of the female terminal is similarly supported by a support plate part, on the front side and the rear sides of which the contact parts of the first elastic plate part are respectively arranged.

4. The terminal structure according to claim 3, wherein:
the support plate part is formed such that a movement of the front side contact part of the elastic plate part is not transmitted to the rear side contact part, or such that a movement of the rear side contact part is not transmitted to the front side contact part.

5. The terminal structure according to claim 1, wherein:
the female terminal is provided with another elastic plate part that can be elastically deformed in a direction different from a direction in which the at least one set of elastic plate parts is deformed; and
the other elastic plate part is capable of pressing another contact part of the male terminal other than the contact parts of the male terminal.

6. The terminal structure according to claim 5, wherein:
the other elastic plate part is configured to press a lower surface of the male terminal.

7. The terminal structure according to claim 5, wherein:
a plurality of the other elastic plate parts are provided.

8. The terminal structure according to claim 1, wherein:
a plurality of the female terminals are provided in the insertion direction of the male terminal.

9. The terminal structure according to claim 1, wherein:
the male terminal and the female terminal are provided for a power terminal or a signal terminal.

10. The terminal structure according to claim 1, wherein:
the male terminal is provided in an electric tool, whereas the female terminal is provided in a battery pack.

11. The terminal structure according to claim 1, wherein:
the male terminal is provided in a battery pack, whereas the female terminal is provided in an electric tool.

12. The terminal structure according to claim 1, wherein:
the male terminal is provided in a charger, whereas the female terminal is provided in a battery pack.

13. The terminal structure according to claim 1, wherein:
the male terminal is provided in a battery pack, whereas the female terminal is provided in a charger.

14. An electric power tool that includes the terminal structure according to claim 1.

* * * * *